(12) United States Patent
Chesla

(10) Patent No.: US 8,510,834 B2
(45) Date of Patent: Aug. 13, 2013

(54) AUTOMATIC SIGNATURE PROPAGATION NETWORK

(75) Inventor: Avi Chesla, Tel Aviv (IL)

(73) Assignee: Radware, Ltd., Tel Aviv (IL)

( * ) Notice: Subject to any disclaimer, the term of this patent is extended or adjusted under 35 U.S.C. 154(b) by 1285 days.

(21) Appl. No.: 11/869,067

(22) Filed: Oct. 9, 2007

(65) Prior Publication Data

US 2008/0086772 A1 Apr. 10, 2008

Related U.S. Application Data

(60) Provisional application No. 60/828,691, filed on Oct. 9, 2006.

(51) Int. Cl.
*H04L 29/06* (2006.01)

(52) U.S. Cl.
USPC ............................................. 726/23; 713/168

(58) Field of Classification Search
USPC .................. 726/23, 22, 25; 713/168, 171
See application file for complete search history.

(56) References Cited

U.S. PATENT DOCUMENTS

| | | | | |
|---|---|---|---|---|
| 5,452,442 | A * | 9/1995 | Kephart | 714/38 |
| 7,028,179 | B2 | 4/2006 | Anderson et al. | |
| 7,254,713 | B2 * | 8/2007 | D'Souza | 713/182 |
| 7,913,303 | B1 * | 3/2011 | Rouland et al. | 726/23 |
| 2004/0128550 | A1 * | 7/2004 | Govindarajan et al. | 713/201 |
| 2004/0148520 | A1 * | 7/2004 | Talpade et al. | 713/201 |
| 2005/0114457 | A1 * | 5/2005 | Shih | 709/206 |
| 2006/0107321 | A1 * | 5/2006 | Tzadikario | 726/22 |
| 2006/0236402 | A1 * | 10/2006 | Russell et al. | 726/25 |
| 2007/0094728 | A1 * | 4/2007 | Julisch et al. | 726/23 |
| 2008/0034425 | A1 * | 2/2008 | Overcash et al. | 726/22 |

\* cited by examiner

*Primary Examiner* — Darren B Schwartz
*Assistant Examiner* — John B King
(74) *Attorney, Agent, or Firm* — Myers Wolin, LLC

(57) ABSTRACT

A distributed security system wherein intelligent security agents (i.e., agent devices) share security incident information between themselves via a controller. An adaptive security decision making involving network worms (non-SMTP worms) and DoS floods attacks is also described; wherein the Worms and DoS flood digital signatures are generated to assist in intrusion prevention process.

12 Claims, 25 Drawing Sheets

1

AUTOMATIC SIGNATURE PROPAGATION NETWORK

RELATED APPLICATIONS

This application claims the benefit of U.S. Provisional Application 60/828,691 filed Oct. 9, 2006, which is incorporated herein by reference.

BACKGROUND OF THE INVENTION

1. Field of Invention

The present invention relates generally to the field of intrusion prevention. More specifically, the present invention is related to a novel self-optimizing intrusion prevention system and method.

2. Discussion of Prior Art

FIG. 1 illustrates a prior art intrusion prevention process 100. In such a prior art process, known attack patterns are filtered through the Attack Signature Filtering engine 102 (supported by a vulnerability research team) and the rest of the traffic is passed through a Behavior Analysis component 104. Behavior Analysis component 104 is responsible for detecting abnormal activities that were not detected by the signature engine (such as new and unknown attacks), and to characterize and mitigate them according to this characterization.

In this scenario, the word 'mitigate' is key, as prior art Behavioral Analysis technologies cannot hermetically block unknown attacks, but rather mitigate them. This inherent limitation of the prior art originates in the fact that a Behavior Analysis system must analyze multiple sequential events before making an accurate decision about a behavior. Thus, there is always a chance that the attack will be able to slip through and hit the protected network. Taking the example of worm propagation, even a small amount of packets that succeed to slip through the protection before the behavior of the worm has been correctly characterized can impose a threat to the network.

The U.S. patent to Anderson et al. (U.S. Pat. No. 7,028, 179), assigned to Intel Corporation, teaches an apparatus and method for secure, automated response to distributed denial of service attacks. Anderson et al. teach a method comprising the steps of receiving notification of a distributed denial of service (DDoS) attack, establishing security authentication with an upstream router from which attack traffic is received, and transmitting one or more filters to the upstream router such that attack traffic is dropped by the upstream router to terminate the DDoS attack. However, it should be noted that Anderson et al.'s method fails to teach or suggest a signature characterization process and/or propagation rules mechanisms implemented in conjunction with such transmission of filters.

Whatever the precise merits, features, and advantages of the prior art, none of them achieves or fulfills the purposes of the present invention.

SUMMARY OF THE INVENTION

Embodiments herein describe a distributed security system based on intelligent security agents that share security incident information between them. The system provides adaptive security decision making involving network worms (non-SMTP worms) and DoS floods attacks. The present invention provides an adaptive process that reduces blocking response time and improves protection coverage against unknown ("zero-day") attacks, such as (but not limited to) worms and DoS/DDoS flood attacks. Embodiments herein automatically create, characterize and then propagate (based on the characterization attributes), worms and DoS flood digital signatures which assist in the intrusion prevention process, which may be as a complementary solution to the traditional attack signatures detection method. Thus overall security coverage of each individual network security device when under attack is improved. In addition, an in-depth risk analysis—analysis of major attack outbreaks and their propagation vectors per and between geographical areas may be provided.

Embodiments herein describe a distributed security system comprising a plurality of intelligent security agents distributed across a network, the intelligent security agents include a black list identifying a plurality of signatures used in restricting packet flow in the network; a signature creating module to create an attack signature through behavioral analysis; a propagation mechanism to propagate the created attack signature to a controller; an external update mechanism to receive updates to the black list from the controller; and the controller communicating with the plurality of the intelligent security agents over the network, the controller receiving the created attack signatures from at least one intelligent security agent and, according to pre-defined propagation rules and the signature's characteristic attributes, the controller updating a black list associated with the plurality of intelligent security agents distributed across the network with the created signature.

Also described is an article of manufacture comprising a computer usable medium having computer readable program code embodied therein. The computer readable program code for maintaining a black list identifying a plurality of signatures used in restricting packet flow in the network; for creating an attack signature and a signature's characteristic attributes through behavioral analysis; for aiding in propagating the created attack signature to a controller; for aiding in receiving updates to the black list from the controller. Additionally the controller communicates with the plurality of intelligent security agents over the network, the controller receiving created attack signatures from at least one intelligent security agent and updating (for example, through pre-defined propagation rules that are based on the signature's characteristic attributes) a black list associated with each of the plurality of intelligent security agents distributed across the network with the created signature.

Another embodiment describes a plurality of intelligent security agents distributed across a network, and a method as implemented in the intelligent security agents includes identifying a plurality of signatures used in restricting packet flow in the network; creating an attack signature through behavioral analysis based on attack footprint information; propagating the attack signature to a controller. The controller may receive the attack signature from an intelligent security agent, and the controller, according to a pre-defined propagation rules and the signature's characteristic attributes, updating a black list associated with the plurality of intelligent security agents distributed across the network with the attack signature. The update being performed via an external update mechanism associated with the plurality of intelligent security agents distributed across the network. The footprint information may relate to DoS attacks and worm attacks.

In addition, a method implemented in a controller communicating with a plurality of intelligent security agents distributed across a network is described. The method includes: receiving at least one attack signature from an intelligent security agent over the network, the attack signature created through behavioral analysis based on attack footprint information regarding DoS attacks and worm attacks; propagating the received attack signature to the plurality of intelligent security agents (based on the pre-defined propagation rules and the signature's characteristic attributes), wherein a black list associated with the plurality of intelligent security agents distributed across the network is updated with the propagated attack signature.

Also described is an article of manufacture comprising a computer usable medium having computer readable program code embodied therein, the medium comprising: computer readable program code for identifying a plurality of signatures used in restricting packet flow in the network; for creating an attack signature through behavioral analysis based on attack footprint information; for aiding in propagating the attack signature to a controller; wherein the controller receives the created attack signature from an intelligent security agent and the controller updating a black list associated with each of the plurality of intelligent security agents distributed across the network with the attack signature (based on the pre-defined propagation rules and signature's characteristic attributes).

Another embodiment describes an article of manufacture comprising a computer usable medium having computer readable program code embodied therein for execution by a controller comprising: computer readable program code for aiding in receiving at least one attack signature from an intelligent security agent over the network, the attack signature created through behavioral analysis based on attack footprint information regarding DoS attacks and worm attacks; for aiding in propagating the received attack signature to the plurality of intelligent security agents (based on the pre-defined propagation rules and the signature's characteristic attributes), wherein a black list associated with each of the plurality of intelligent security agents distributed across the network is updated with the propagated signature.

DESCRIPTION OF THE PREFERRED EMBODIMENTS

While this invention is illustrated and described in various embodiments, the present disclosure is to be considered as an exemplification of the principles of the invention and the associated functional specifications for its construction and is not intended to limit the invention to the embodiments illustrated. Those skilled in the art will envision many other possible variations within the scope of the present invention.

The intrusion prevention process is capable of optimizing itself in a manner that minimizes the chances that zero day DoS and Worm attacks will slip through the protection system. The intrusion prevention process characterizes the signature of a created "behavioral" signature (through attributes of accuracy, generality etc) and uses these characteristics for efficient signature propagation between devices in different network locations (and across networks).

Figure 1:
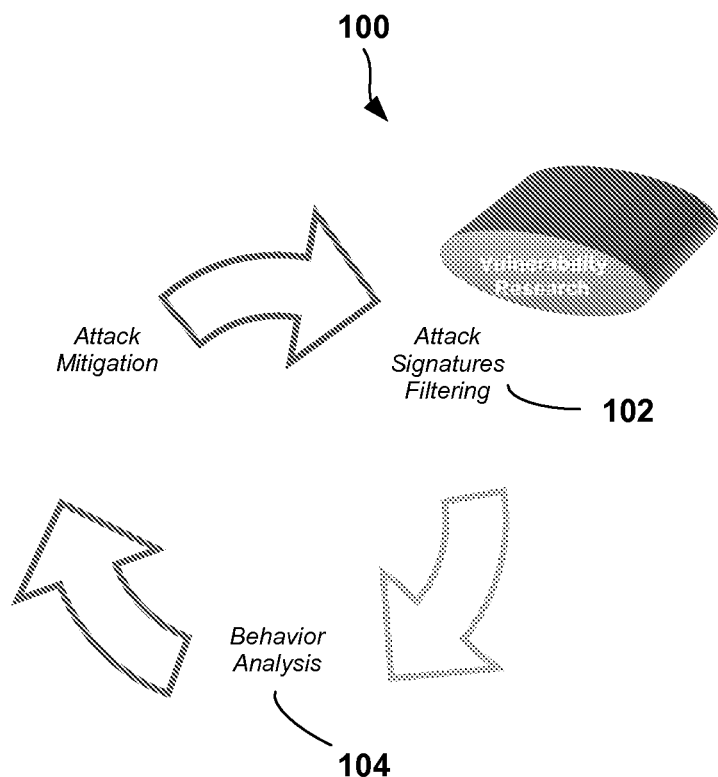
FIG. 1 illustrates an intrusion prevention process.
Figure 2:
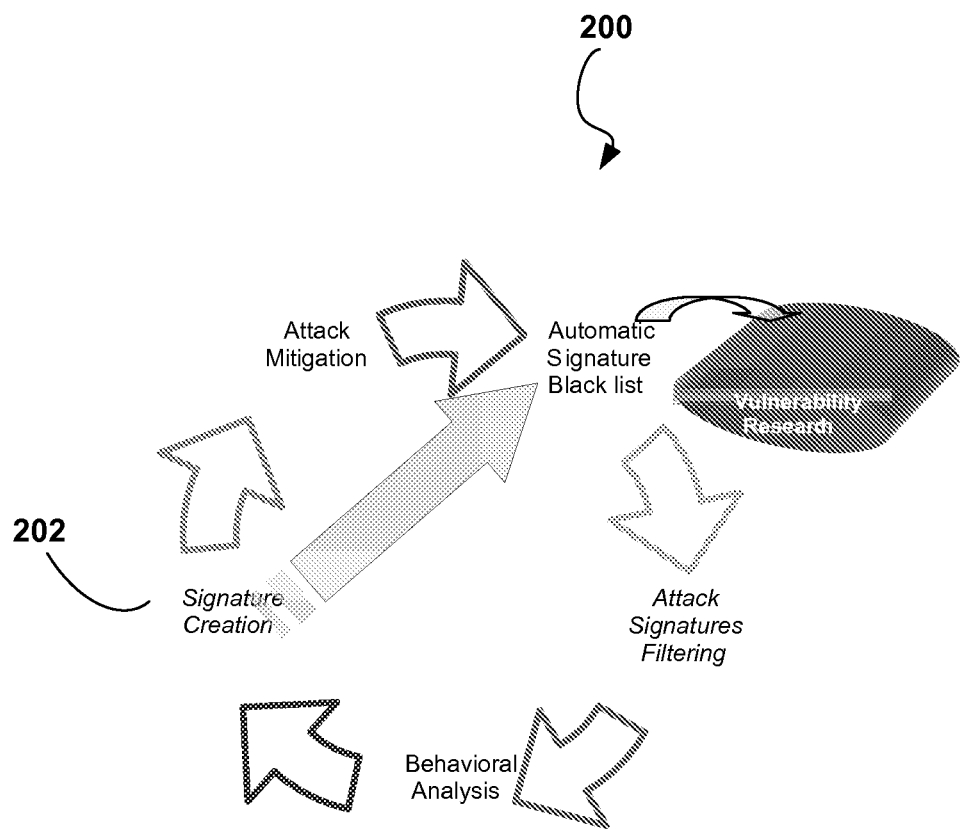
FIG. 2 illustrates an exemplary embodiment of an intrusion prevention process.

FIG. 2 illustrates an exemplary embodiment of an intrusion prevention process 200.

Automatic Attack Signature Creation—202

As shown in FIG. 2, the intrusion prevention process 200 includes an automatic creation of DoS floods and Worms attack signatures through behavioral analysis. Examples of two technologies to create the attack signatures are listed below:

1. Behavioral DoS protection; and
2. Enhanced anti-scan protection that enables an accurate characterization of the packets participating in the scan (i.e., scan's footprint), wherein the anti-scan will enable more specific characterization of self-propagating network worms (including low-rate propagation that typifies the initial worm infection activities in a network).

In one embodiment, the automatic attack signatures are defined according to parameters that are taken from the headers of layer 3, layer 4 and a few parameters that are taken from layers 5 and 7.

Automatic Signature Propagation

Upon creation of an attack signature, the system will send the signature to the controller. The next step is to propagate the signatures to the other agent devices (to a generic black list in each agent device) according to a pre-defined propagation rules. Any packet that matches the signature will be dropped (the agent device that created the attack signature can get the generic signature back if the signature propagation rules in the controller will instruct to do so).

Figure 3:
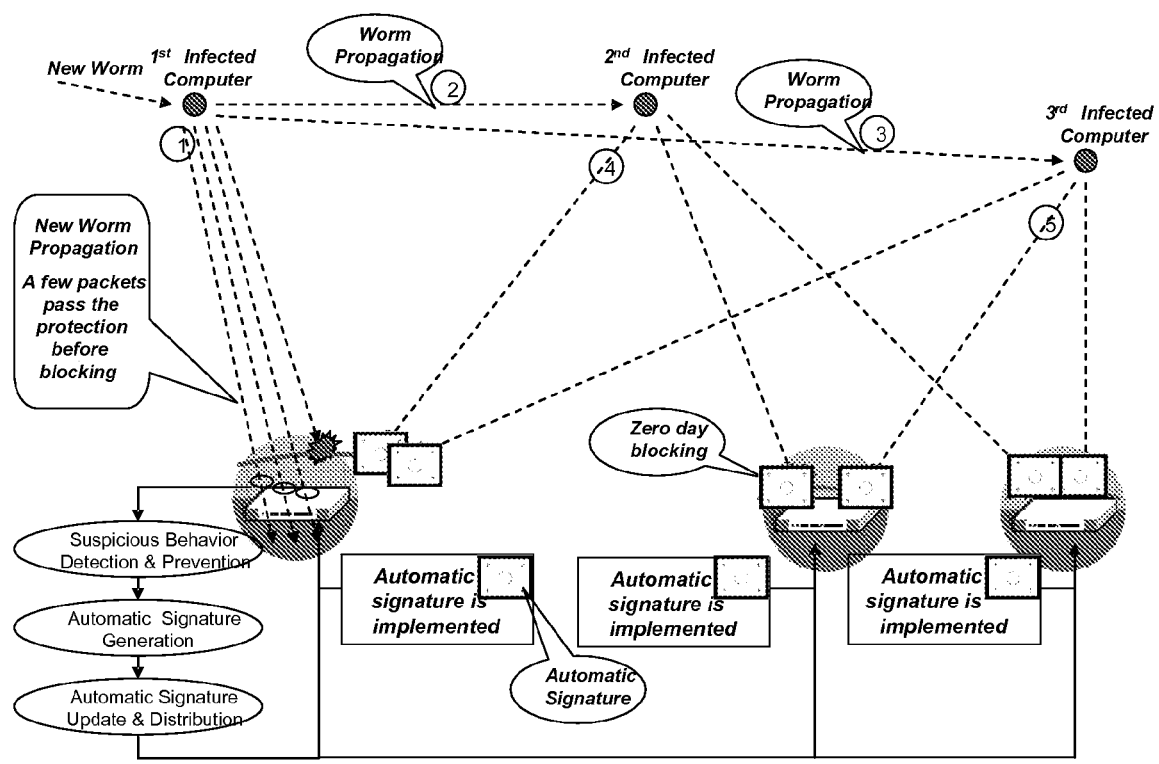
FIG. 3 illustrates an exemplary embodiment of a Signature Propagation Concept.

FIG. 3 illustrates a Signature Propagation Concept. FIG. 3 illustrates a signature propagation network that includes three agent devices. When the first agent device detects (through statistical behavioral analysis) a zero day network worm, the worm is characterized and a worm signature is created accordingly. The worm signature is then propagated to the other agent devices. It should be noted that with respect to the description of FIG. 3, the controller (not shown) is responsible for the signature propagation between agent devices. The other devices can then block this worm immediately according to the signature. The following describes the mechanism that is responsible for the signature creation.

Figure 4:
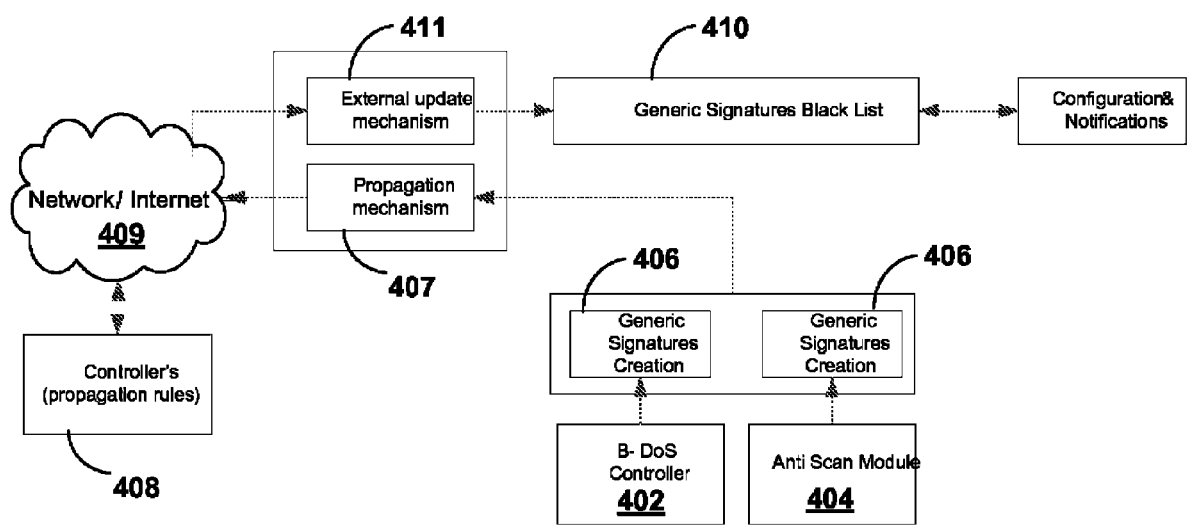
FIG. 4 illustrates a system diagram describing modules associated with the present invention.

FIG. 4 illustrates a system diagram describing modules associated with the present invention. B-DoS 402 and Anti-scan modules 404, configured to be part of the generic signature generation process, send attack footprint information to the generic signature creation modules 406. The generic signature creation modules 406 are responsible for selecting footprint types and values that are "appropriate" to be included in a generic signature according to pre-defined rules. A decision is made according to multiple signature characteristics parameters such as footprint type, footprint accuracy/strictness level, footprint consistency, attack duration and other parameters that are analyzed before a generic signature can be created. Some of these parameters can be tuned through advanced configuration options (for example, in each agent device).

Upon generation of a new generic signature, the system, using propagation mechanism 407, sends the new generic signature to the "controller" 408 (i.e., controller) over a network 409 (e.g., the Internet). Controller 408 is responsible for all signature propagation tasks. Controller 408 updates the external agent device's black list 410 using external update mechanism 411. When agent device receives a new generic signature list from the controller 408, it updates the Generic Signatures Black List 410 with it. The generic black list 410 improves the response time of the system itself to new zero-day attacks.

In one embodiment, the black list is configured to apply only to certain policies through advanced configuration, i.e., the admin can select a network segment that will not be protected by the generic signatures.

By allowing policy based signature propagation, MSSP (Managed Security Service Provider) that protects multiple customers through multiple policies in one box will be able to give this service only to the customers that have paid to be part of the automatic signature propagation network.

According to the configured policy, a packet that enters the system will be inspected by the generic black list, and in case a match is found, the packet will be dropped before forwarding it to other protection modules in the system.

Generic Signature Creation

Each generic signature generation module 406 receives inputs from the protection module. In this stage, there are two protection modules: B-DoS protection 402 and Anti-Scan module 404 (it is also envisioned that more protections that can generate attack behavioral signatures can take advantage of this generic signature creation module and the automatic signature propagation system). The generic signature creation module 406 analyzes each detected attack footprint rule (the footprint rule is composed from multiple footprint types and values) and decides if to approve, modify or reject it according to generic rules criteria.

Generic Rules Criteria (B-DoS)

Upon detection of an attack, the B-DoS module generates an attack footprint rule consisting of attack footprints types and values. Tables 1-4 lists examples of footprint types that can be included in the attack footprint rule. Each footprint type is characterized according to the level of its generality, accuracy and a worm characteristic score.

TABLE 1

All TCP Behavioral Flood Protections - Footprint Types Table

| H# | Footprint Type | Generic | Generic/ source area | Generic/ target area | Footprint type Accuracy level | Default worm characteristic score | Default configuration mode |
|---|---|---|---|---|---|---|---|
| 1 | TCP Sequence Number | Yes | — | — | High | Zero | Enabled |
| 2 | IP ID number | Yes | — | — | High | Zero | Enabled |
| 3 | Source Port | No | — | — | Med | Low | Dynamic |
| 4 | Source IP address | No | Yes | No | Low | Zero | Dynamic |
| 5 | ToS (Type of Service) | Yes | — | — | Med | Med | Enabled |
| 6 | Packet Size | Yes | — | — | Med | Low | Enabled |
| 7 | Fragment | Yes | — | — | Low | — | Disabled |
| 8 | Fragment offset | Yes | — | — | High | — | Enabled |
| 9 | Destination Port | Yes | — | — | Low | dynamic score (High-Low, Negative) | Enabled |
| 10 | Destination IP address | No | No | Yes | Low | dynamic score (Zero-High, Positive) | Disabled |
| 11 | TTL | No[1] | Yes | Yes | Med | — | Disabled |

[1] Generic for a specific route between source and target networks

TABLE 2

All UDP Behavioral Flood Protections - Footprint Types Table

| H# | Footprint Type | Generic | Generic/ source area | Generic/ target area | Footprint Type Accuracy level | Default worm characteristic score | Default configurable mode |
|---|---|---|---|---|---|---|---|
| 1 | Transport Checksum | No | No | No | High | Zero | Disabled |
| 2 | IP ID | Yes | — | — | High | Zero | Enabled |
| 3 | DNS ID number (port 53) | Yes | — | — | High | — | Enabled |
| 4 | DNS Qname (port 53) | No | No | Yes | Low | — | Disabled |
| 5 | DNS Qcount (port 53) | Yes | — | — | High | — | Enabled |
| 6 | Source Port | No | No | No | Med | Low | Dynamic |
| 7 | Source IP address | No | Yes | No | Low | Zero | Dynamic |
| 8 | ToS (Type of Service) | Yes | — | — | Med | Med | Enabled |
| 9 | Packet Size | Yes | — | — | Med | Dynamic score (High-Low, Negative) | Enabled |
| 10 | Destination Port | Yes | — | — | Low | Dynamic score (High-Low, Negative) | Enabled |
| 11 | Destination IP address | No | No | Yes | Low | dynamic score (Zero-High, Positive) | Disabled |
| 12 | Fragment | Yes | — | — | Low | — | Enabled |
| 13 | TTL | No[1] | Yes | Yes | Med | — | Disabled |

TABLE 3

All ICMP Behavioral Flood Protections - Footprint Types Table

| H# | Footprint Type | Generic | Generic/ source area | Generic/ target area | Accuracy level | Default worm characteristic score | Default configuration mode |
|---|---|---|---|---|---|---|---|
| 1 | Transport Checksum | No | — | — | High | Zero | Disabled |
| 2 | IP ID number | Yes | — | — | High | Zero | Enabled |
| 3 | Source IP address | No | Yes | No | Low | Zero | Dynamic |
| 4 | ToS (Type of Service) | Yes | — | — | Med | Med | Enabled |
| 5 | Packet Size | Yes | — | — | Med | Dynamic score (High-Low, Negative) | Enabled |
| 6 | Destination IP address | No | No | Yes | Low | dynamic score (Zero-High, Positive) | Disabled |
| 7 | ICMP Message Type | Yes | — | — | Low | Low | Enabled |
| 8 | Fragment | Yes | — | — | Low | — | Enabled |
| 9 | TTL | No[1] | Yes | Yes | Med | — | Disabled |

TABLE 4

All IGMP Behavioral Flood Protection - Footprint Types Table

| H# | Footprint Type | Generic | Generic/ source area | Generic/ target area | Accuracy level | Default worm characteristic score | Default configuration mode |
|---|---|---|---|---|---|---|---|
| 1 | Transport Checksum | No | — | — | High | Low* | Disabled |
| 2 | IP ID number | Yes | — | — | High | Low* | Enabled |

TABLE 4-continued

All IGMP Behavioral Flood Protection - Footprint Types Table

| H# | Footprint Type | Generic | Generic/ source area | Generic/ target area | Accuracy level | Default worm characteristic score | Default configuration mode |
|---|---|---|---|---|---|---|---|
| 3 | Source IP address | No | Yes | No | Low | Low* | Dynamic |
| 4 | ToS (Type of Service) | Yes | — | — | Med | Low* | Enabled |
| 5 | Packet Size | Yes | — | — | Med | Low* | Enabled |
| 6 | Destination IP address | No | No | Yes | Low | Low* | Disabled |
| 7 | IGMP Message Type | Yes | — | — | Low | Low* | Enabled |
| 8 | Fragment | Yes | — | — | Low | — | Enabled |
| 9 | TTL | No[1] | Yes | Yes | Med | — | Disabled |

[1]Generic for a specific route between source and target networks
*Note: IGMP will probably not be used as a transmission protocol for worm propagation; therefore, all worm scores are set to low.

B-DoS (Behavioral Denial of Service) Generic Signature Decision Making

Figure 5:
FIG. 5 illustrates a process occurring prior to the creation of a generic signature by the Behavioral Denial of Service (B-DoS) module.

FIG. 5 illustrates a process that takes place in each generic signature creation module before B-DoS generic attack signature is created.

Blocking Rule Consistency Check—502

In case that the BDoS controller (the controller is a finite state machine that holds that BDoS protection states) remains more than CTh seconds in state 6 (i.e., blocking state), the attack footprint rule is considered to be effective and stable. Any other controller state represents an attack footprint rule that is in the middle of creation or an optimization process or not strict enough (e.g., too many OR's and not enough AND's logical relationships).

Short periods in state 6 also represents a dynamic characteristics of the detected attack, therefore the attack footprint rule will not be a candidate for a generic automatic signature.

Any transition to state 6 will reset the CTh timer again.

Local Strictness Level Conditions—504

A DoS/DDoS Attack footprint rule strictness level is determined according to the number of OR's and AND's logical expressions that construct the rule. Two thresholds: ORTh and ANDTh define the required strictness. These thresholds are configurable inside a set of four strictness profiles.

In case that the footprint rule includes only "high accuracy" footprint types, then the strictness conditions are by-passed and the accuracy level is set automatically to 5 (i.e., very high).

Attack Footprint Rule Refinements and Characterization—506

Footprint Rule Refinements:
a. After the initial two checks, the system will check if there are pre-defined disabled footprint types inside the footprint rule and will remove them. Disabled footprint types are specified in Tables 1-4 above.
   After removing these footprint types, the strictness level is measured again against the refined signature.
b. If after removing the disabled footprints the strictness level remains in the defined constraints, the system will try to remove (in a pre-defined order) the "dynamic" footprints type in order to generalize the footprint rule. Removing dynamic footprints will occur only if the resultant footprint rule strictness level still complies with the ANDTh constraints (in this way the system will try to achieve the most generic signature that also comply with the pre-defined strictness rules). Dynamic footprint types are specified in Tables 1-4 above.

Footprint Rule Characterization Process:

Accuracy score—The new DoS/DDoS footprint rule is assigned with an accuracy score. This score is defined according to the number of AND's, OR's logical relationships (i.e., footprint's strictness level) and the accuracy level of the existing footprint types. This score enables the propagated generic signature to be identified with a level of accuracy before it is allowed to update the generic signature black lists(s) on other agent devices through the controller.

Figure 6:
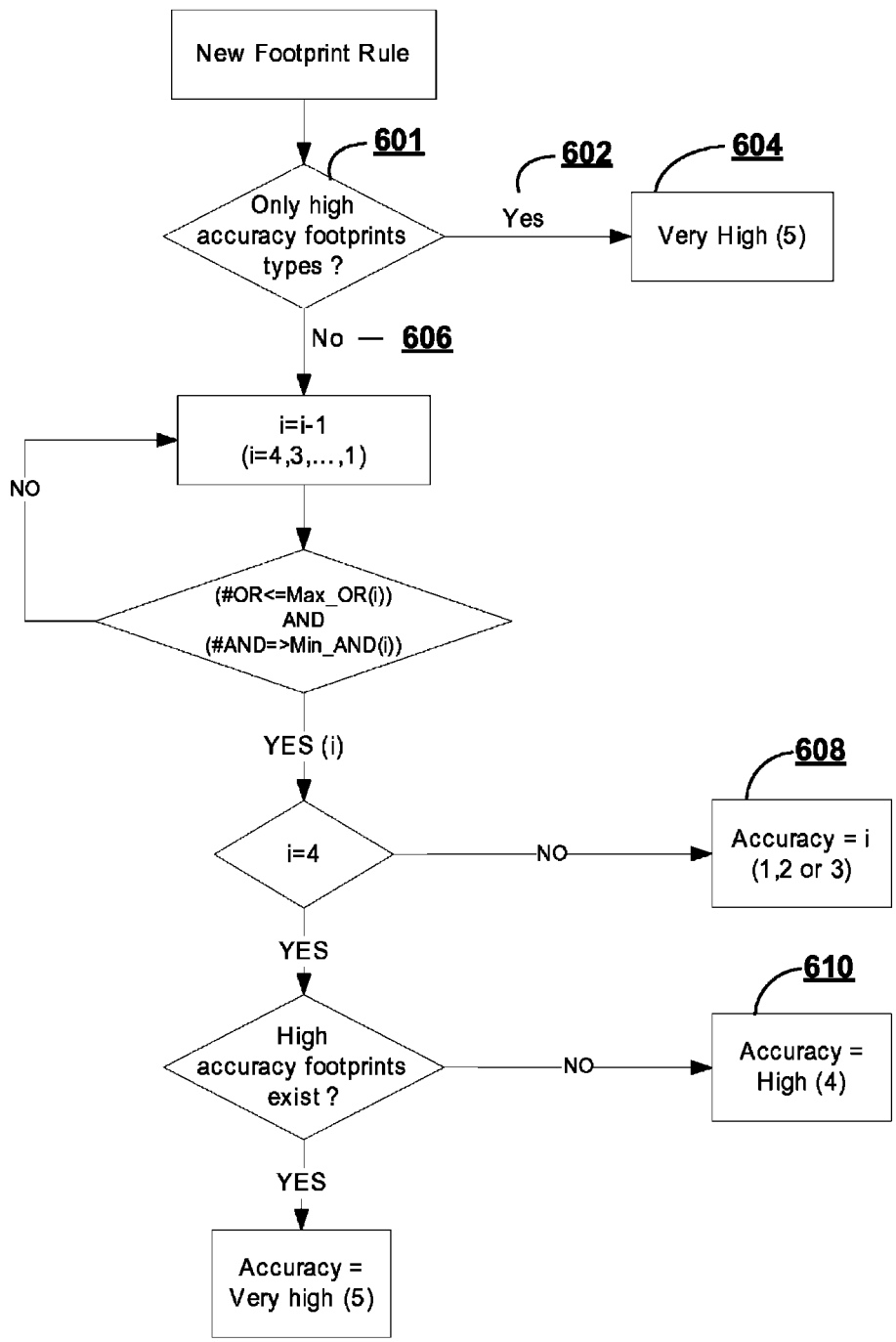
FIG. 6 illustrates a flow chart outlining how a DoS signature accuracy score is calculated.

FIG. 6 illustrates a flow chart outlining how such an accuracy score is calculated. High accuracy footprints types are specified in Tables 1-4 above (e.g., TCP sequence number, L4 checksum etc).

a. The system checks (601) to see if the footprint rule includes only "high accuracy footprint types" (602), then the footprint accuracy score is set to 5 (Very high) (604). If not (606), then, b. The system checks the lowest strictness level that is associated with the footprint rule. There are four pre defined strictness levels (i=1, 2, . . . , 4. Level 4 is the highest level).

c. In case i<4, then the system assign accuracy level according to (i) between 1 and 3 (i.e., Very low to Medium) (608).

d. In case i=4, then the system checks if the footprint rule includes at least one "high accuracy footprint type." If it is, then the system sets i to 5, i.e., Very high accuracy level. If not, then the footprint's rule accuracy level is 4 (High) (610).

Generality flag—Together with the accuracy score, the footprint rule is assigned with a flag that represents the level of its generality. There are three generality types:

1. Generic (g)—Totally generic rule. This means that the DoS/DDoS attack footprint can be effective for all networks.
2. Generic/source (s)—The generality of the DoS/DDoS footprint rule is limited to a source network (the generic signature includes a source IP address(es)). This signature is effective only in blocking attack traffic that originates in the same source IP address as specified by the agent device that created the attack footprint rule (i.e., same attack from other sources will not be blocked). This option can fit the requirements of large internal networks.
3. Generic/target (t)—The generality of the DoS/DDoS footprint rule is limited to a target network (i.e., the generic signature includes destination IP address(es)). This means that the attack footprint is relevant only for certain networks such as:
   a) Multiple devices that protect a few internet links of the same network;

b) Multiple devices located in the internal network, in the internet gateway of the same network and/or in the upstream (e.g., ISP) that provides the Internet services to the same network (i.e., all protect the same network IP range).
4. Both (b)—The generality of the rule is limited to a combination of certain target and origin networks.

Worm Characteristic Level

The DoS/DDoS footprint rule is assigned with a worm characteristic level according to the existing footprint types.
1. High—high probability that the DoS/DDoS footprint rule represents worm propagation activities
2. Med—Medium probability that the DoS/DDoS footprint rule represents worm propagation activities
3. Low—The footprint rule represents DoS/DDoS attack which is probably not the result of worm propagation activities.

It should be noted that this characteristic level, even if it is set high, doesn't insure that the detected attack contains worm propagation but rather identifies the odds. It is more likely that when the characteristic is set low then one can be sure that the detected flood isn't associated with worm activities.

The Following Worm Characteristic Mechanism is Needed:

The worm scoring mechanism works per L4 flood attack (i.e., TCP syn, TCP others, UDP flood, ICMP flood and IGMP flood).

The worm level is calculated according to the pre-defined footprint score (worm characteristic score—High, Med, Low or Zero) and, in some cases, the number of footprint values that were detected per each of these footprint types (may be termed the 'dynamic score' case).

Worm Dynamic Score

Some of the attack footprint types such as source IP, Destination port, packet size etc, need to have a dynamic worm score mechanism. The score starts at a pre-defined value (as defined in Tables 1-4 above in the default worm characteristic score column) and is changed according to a score weight function. The weight function's input is the type of footprint (e.g., destination IP, Packet size, etc) and the number of detected footprint values of the same footprint type.

Figure 7:
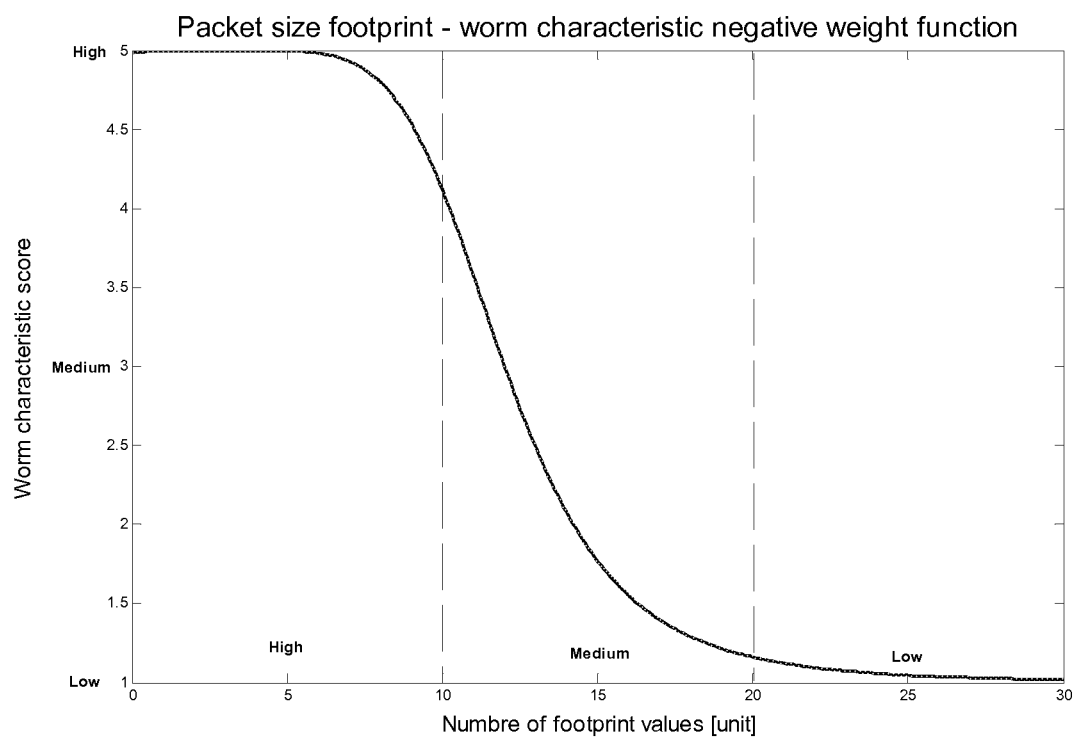
FIG. 7 illustrates a negative weight function (relevant for packet size footprint type) that maps the number of different packet size values that are included in the attack footprint to a worm characteristic score (score range between 1 and 5).

There are two types of weight functions: positive and negative:

FIG. 7 illustrates a negative weight function (relevant for, but not limited to, packet size footprint type) that maps the number of different packet size values that are included in the attack footprint to a worm characteristic score (score range between 1 and 5).

Figure 8:
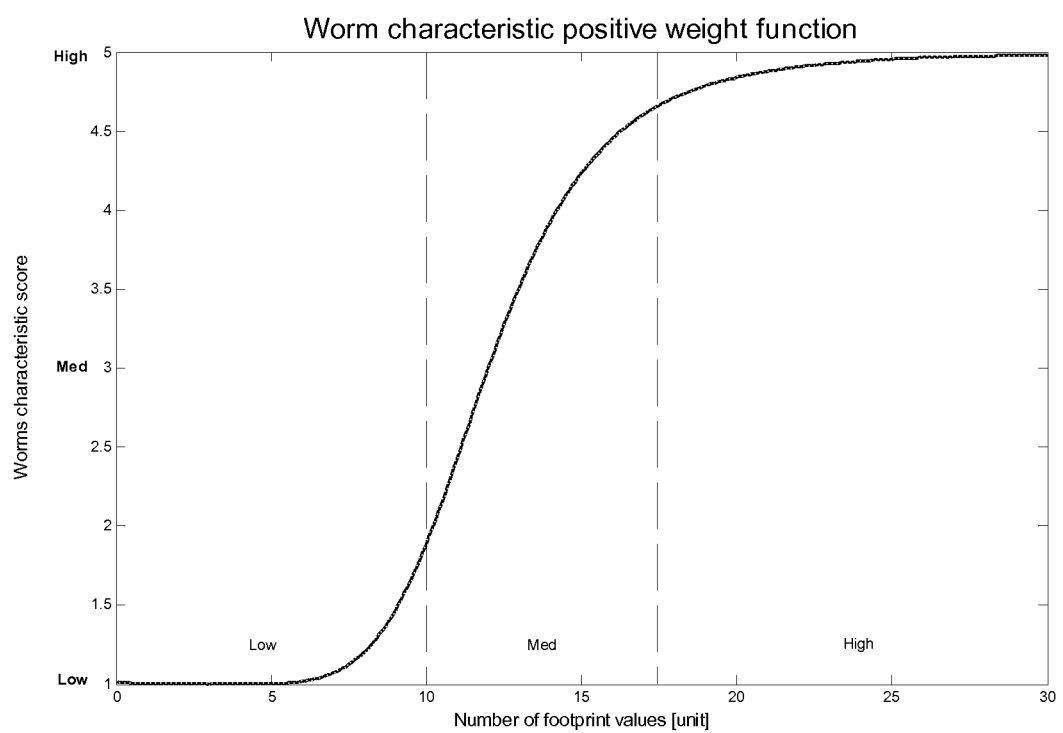
FIG. 8 describes a positive weight function that maps the number of different footprint type values that are included in the attack footprint into a worm characteristic score.

FIG. 8 describes a positive weight function that maps the number of different footprint type values that are included in the attack footprint into a worm characteristic score.

It should be noted that:

Currently, the destination IP footprint type will use the positive weight function Tables 1-4 above specifies which footprint type will use the weight function (i.e., will have dynamic worm characteristic score).

Specification of the weight function is specified below

Worm Static & Dynamic Scores—Specification of Weight Functions

There are two types of worm characteristic scores:

Static score—This is a static score meaning that it doesn't depend on any other Footprint properties. The following Static Score Types are used (for each footprint, that was defined as non-dynamic score in Tables 1-4):

TABLE 5B

| Static Score Type | Numeric values |
| --- | --- |
| ZERO | 0 |
| LOW | 1 |
| MEDIUM | 3 |
| HIGH | 5 |

Dynamic Score—The value of this kind of attribute is a pair of Dynamic Score Type (DST) and integer number (num) higher than zero that represents another property of the footprint.

The value of 'num' can be for example the number of footprint values that were detected per each of these footprint types (e.g., number of different packet size values, number of different destination IP addresses etc).

Typical Dynamic Score Type (DST) that are used are:
1. ZERO-HIGH (positive)
2. HIGH-ZERO (negative)
3. LOW-HIGH (positive)
4. MEDIUM-HIGH (positive)
5. MEDIUM-ZERO (negative)

DST parameter defines the behavior of the weight function and the num value (number of different footprint value) is the function's input.

Weight Function w( )

A typical weight function is cubic spline with only one internal bound point (xinflection) and boundary conditions (xmin, xmax). Each such type of function is uniquely described through a set of 5 values:
xmin, xmax specifies the interval where function varies (the weight outside this interval is defined as constant);
ymin is min weight value;
ymax is max weight value;
xinflection is x-position of inflection point; and
direction: UP/Down FIG. 8 illustrates weights associated with specific characteristic parameters. Table 5C, below, specifies the default weight function characteristics parameters.

TABLE 5C

| DST | Xmin | Xmax | Ymin | ymax | xinflection | Direction |
| --- | --- | --- | --- | --- | --- | --- |
| Zero-High | 3 | 29 | 0 | 5 | 20 | Up (Positive) |
| High-Zero | 3 | 29 | 0 | 5 | 12 | Down (Negative) |
| Low-High | 3 | 29 | 1 | 5 | 20 | Up (Positive) |
| High-Low | 3 | 29 | 1 | 5 | 12 | Down (Negative) |
| Medium-High | 3 | 29 | 3 | 5 | 20 | Up (Positive) |
| Medium-Zero | 3 | 29 | 0 | 3 | 12 | Down (Negative) |

Total Worm Characteristics Score

After setting a worm score (static or dynamic) for each footprint type, the final (total) worm characteristic score is calculated according to the following weight function:

$$s = \exp\left(\frac{lH \cdot N_H + lM \cdot N_M + lL \cdot N_L + \sum_{i=1}^{K} lan(W_i)}{N_H + N_M + N_L + K}\right),$$

where:
$lH = lan(5)$, $lM = lan(3)$, $lL = lan(1) = 0$
$N_H$ is a number of high score footprint types
$N_M$ is a number of medium score footprint types $N_L$ is a number of low score footprint types
K is a number of weighted scores (i.e., number of footprints that went through weight function)
$W_i$=Weighted score of footprint.

Table 5A, below, defines how the final worm's score/level is set:

TABLE 5A

| Worm weighted score range | Final worm level |
|---|---|
| worm_score ≧ 4 | High |
| 3 ≧ worm_score < 4 | Med |
| worm_score < 3 | Low |

Notes:
  The default worm score weight function footprint type and L4 protocol are specified in the Tables 1-4 above in the default worm characteristic score column.
  A geometric type of average is used in the formula in order to increase the influence of small values on the result.
  In case zero score footprint exist, the total worm score (s) is set to zero.
  Attack rate—The new generic DoS/DDoS signature rule is assigned with a traffic rate parameter. The rate includes both PPS and Bytes/sec statistics. The rate is calculated through the Behavioral DoS module. This parameter represents the attack intensity which is associated with the generic DoS/DDoS signature.
  Attack direction—When possible, an attack direction flag will be assigned to each DoS and DDoS generic signature rule.

Figure 9:
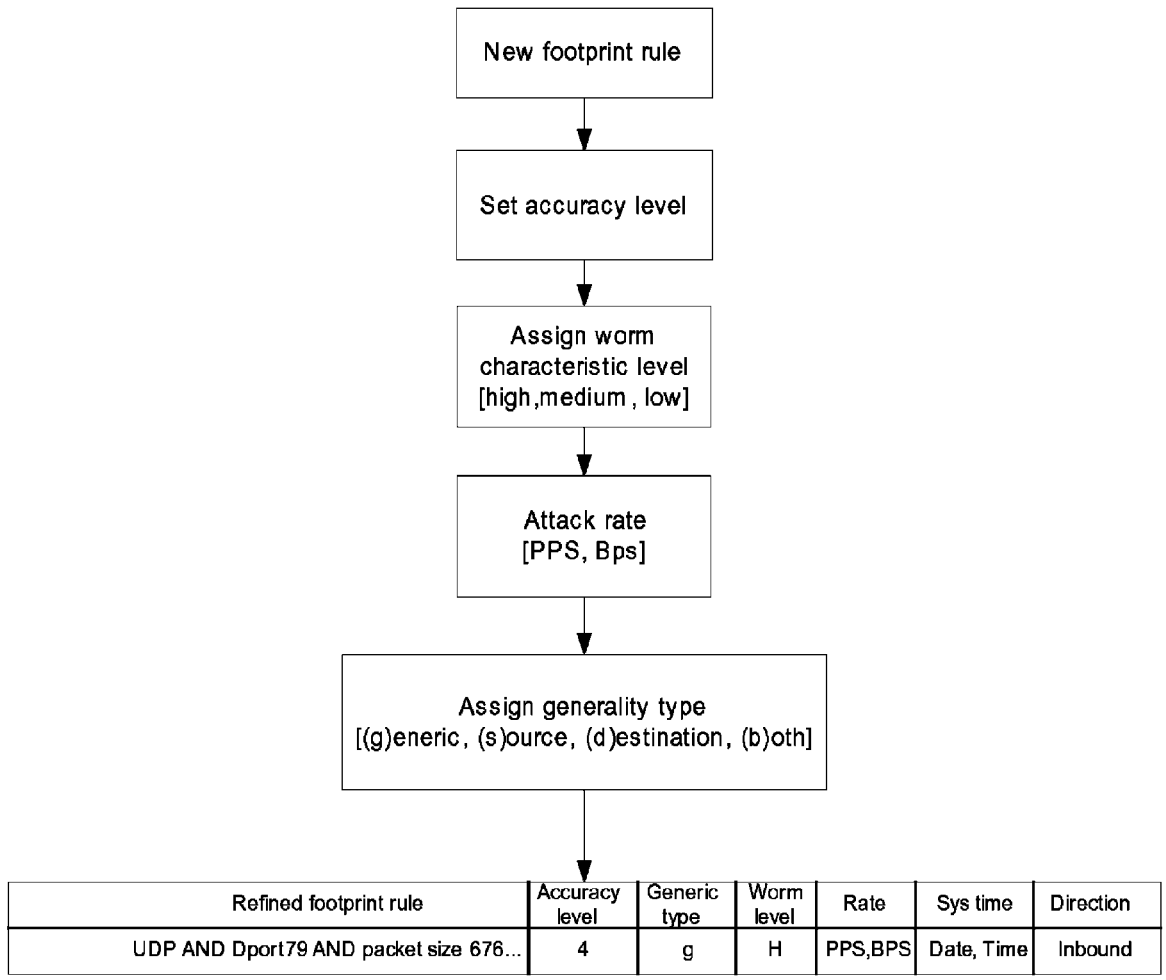
FIG. 9 illustrates a flow summarizing footprint rule characterization processes.

FIG. 9 illustrates a flow that summarizes all footprint rule characterization processes. It should be noted that Attack system time will be assigned to each DoS/DDoS generic signature rule.

Generic Signature Criteria (Anti-Scan)

Most self-propagating network worms (non-SMTP worms) scan the network in order to find vulnerable hosts, thus these activities can be detected by an anti-scan module. The anti scan module is responsible for characterizing the pattern of scan and mitigating it accordingly.

Upon detection of an attack, the Anti-scan module generates a scan attack footprint rule consisting of scan footprint types. A worms' propagation patterns usually include certain footprint types that will be recognized by the anti-scan generic signature creation module.

It should be noted that it is unavoidable that certain pure scanning activities (pre-attack probe activities) will be characterized as worm propagation. However, there is also a benefit in the detection of generic signatures that identifies new automatic network scanning tools (i.e., pre-attack probe tools) and blocking them through an automatic signature propagation network.

The anti-scan raises an attack alert per L4 protocol type (TCP, UDP or ICMP). Tables 6-8 outline footprint types that can be included per protocol type (each footprint type is characterized according to the level of its generality, accuracy and worm level). It should be noted that in the case of the Anti-Scan generic signatures, the worm level is calculated through static score type.

TABLE 6

UDP Scans - Footprint Types Table

| # | Footprint Type | Generic | Generic/ source area | Generic/ target area | Accuracy level | Default worm characteristic score | Default configuration mode |
|---|---|---|---|---|---|---|---|
| 1 | IP ID | Yes | — | — | High | Zero | Dynamic |
| 2 | Source IP address | No | Yes** | No | Low | — | Dynamic |
| 3 | Packet Size | Yes | — | — | Med | High | Enabled |
| 4 | Destination Port | Yes | — | — | Low | High | Enabled |
| 5 | Destination IP address | No | No | Yes | Low | Zero | Disabled |
| 6 | TTL | No | Yes | Yes | Med | — | Enabled |
| 7 | Payload hash | Yes | — | — | High | High | Enabled |

TABLE 7

TCP Scans - Footprint Types Table

| # | Footprint Type | Generic | Generic/ source area | Generic/ target area | Accuracy level | Default worm characteristic score | Default configuration mode |
|---|---|---|---|---|---|---|---|
| 1 | TCP Sequence Number | Yes | — | — | High | Zero | Dynamic |
| 2 | IP ID | Yes | — | — | High | Zero | Dynamic |
| 3 | Source IP address | No | Yes** | No | Low | — | Dynamic |
| 4 | Packet Size | Yes | — | — | Med | —* | Enabled |
| 5 | Destination Port | Yes | — | — | Low | High | Enabled |
| 6 | Destination IP address | No | No | Yes | Low | Zero | Disabled |
| 7 | TTL | No | Yes | Yes | Med | — | Enabled |
| 8 | HTTP URL | Yes | — | — | Low | High*** | Enabled |

TABLE 7-continued

TCP Scans - Footprint Types Table

| # | Footprint Type | Generic | Generic/ source area | Generic/ target area | Accuracy level | Default worm characteristic score | Default configuration mode |
|---|---|---|---|---|---|---|---|
| 9 | Payload hash | Yes | — | — | High | High*** | Enabled |

*In case of TCP, packet size cannot typically characterize worm activities (for this case a TCP stream/transaction size can be measured).
**In internal networks configuration, source IP can be a good footprint in order to isolate hosts that are infected with worms.
***There is an option to use "delayed binding" (i.e., proxy) mechanism, as a dynamic "virtual honey-pot." For example, when the anti-scan trigger and alerts, the protection system will respond by itself to the source of the scan (become a proxy) and thus will enable to identify payload footprints types inside the TCP transactions such as HTTP URL's, payload hash etc.

Another option that will allow the anti-scan protection module to identify a payload footprint inside the TCP transactions is to work in detection only mode. In this mode, when a TCP scan alert is generated, all packets that are associated with the source of the scan will be sent to a deep packet inspection (DPI) module in order to detect application level (L7) footprints. Only then will the filter become active.

TABLE 8

ICMP Scans - Footprint Types Table

| H# | Footprint Type | Generic | Generic/ source area | Generic/ target area | Accuracy level | Default worm characteristic score | Default configuration mode |
|---|---|---|---|---|---|---|---|
| 1 | IP ID | Yes | — | — | High | Zero | Dynamic |
| 2 | Source IP address | No | Yes** | No | Low | — | Dynamic |
| 3 | Packet Size | Yes | — | — | High**** | Low | Enabled |
| 4 | ICMP Message type | Yes | — | — | Low | — | Enabled |
| 5 | TTL | No | Yes | Yes | Med | — | Enabled |

****ICMP packet size can improve the accuracy of the footprint rule only in case that the detected size is not one of the default legitimate ICMP message sizes (e.g., 74 bytes).

Figure 10:
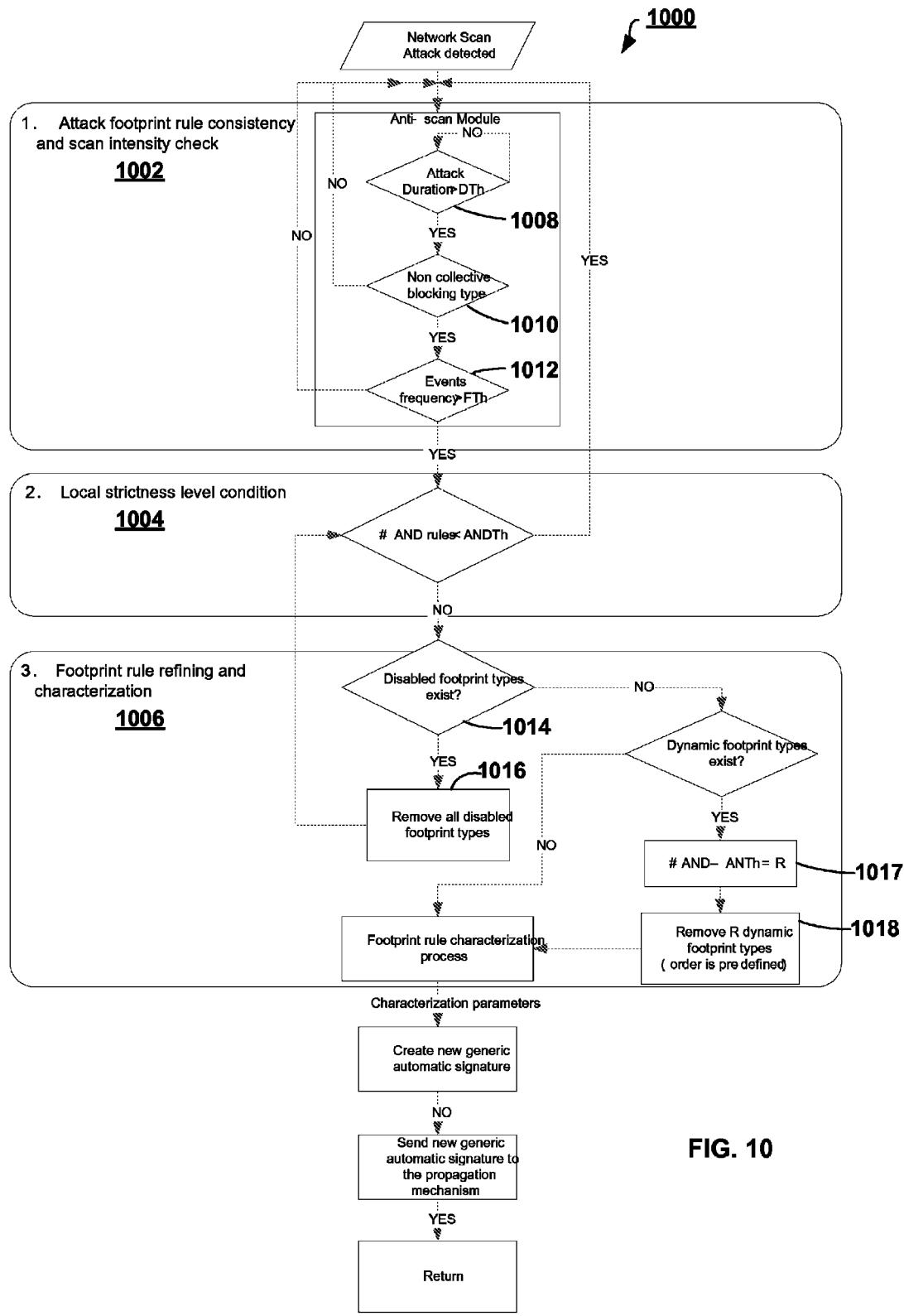
FIG. 10 illustrates a process occurring prior to the creation of a generic signature by the Anti-scan module

FIG. 10 illustrates the generic signature decision making process 1000. The process takes place in each generic signature creation module before a generic automatic worm signature can be created.

Attack Footprint Rule Consistency and Scan Intensity Check—1002

A check 1008 is performed to see if the attack duration (scanning activities) is more than DTh seconds, and if so, the blocking rule is considered effective and stable (same as the attack activities). Next, check 1010 is performed to see if the attack footprint rule isn't a collective rule, which means that it includes more than just source IP address and L4 protocol footprint types, and if so, then the system goes to the next check. The next check 1012 is the average frequency of the attack. The frequency represents the intensity of the scanning activities which is supposed to be high (per source IP) in case of worm propagation (a worm that infects a host will try to use most of the hosts CPU resources in order to spread and infect other hosts). In case that the average attack frequency is above FTh [Hz], then the system continues to the next check. In one embodiment, these thresholds (DTh and FTh) are tunable through advanced configurations.

Local Strictness Level Condition—1004

Attack (scan) footprint rule strictness level is determined according to the number of AND's logical relationships that construct the rule. The threshold ANDTh defines the required strictness. This thresholds is configurable inside a set of three strictness profiles. In case that the footprint rule includes only "high accuracy" footprint types, then all other strictness conditions are by-passed and the accuracy level is set to 4 (i.e., very high).

Footprint Rule Refining and Characterization—1006
Footprint refinements:
a. After the initial four checks, the system performs check 1014 to see if there are pre-defined "disabled" footprint types inside the attack footprint rule and if such "disabled" footprints exist, then the system removes them in step 1016. Disabled footprint types (those that, through configuration, are not allowed to participate in the scan footprint rule) are specified above in Tables 6-8. After removing these footprint types, the footprint rule strictness level is measured again.
b. If after removing the disabled footprint the strictness level remains in the defined constraints, the system, in step 1018, removes the "dynamic" footprints type in order to generalize the footprint even further. Removing dynamic footprints occur only if the resultant footprint rule strictness level still complies, as in step 1017, with the ANDTh constraints. Enabled, Dynamic and Disabled footprint types are specified in Tables 6-8 above.

Footprint Rule Characterization Process

Accuracy score—The new footprint rule is assigned with an accuracy score. This score is defined according to the number of AND's logical relationships and the accuracy level of the footprint types that are included in the footprint rule. This score enables to be identify the signature with a level of accuracy before it is allowed to be propagated to other Agent devices (i.e., propagation rules that are implemented in the controller include accuracy conditions).

Figure 11:
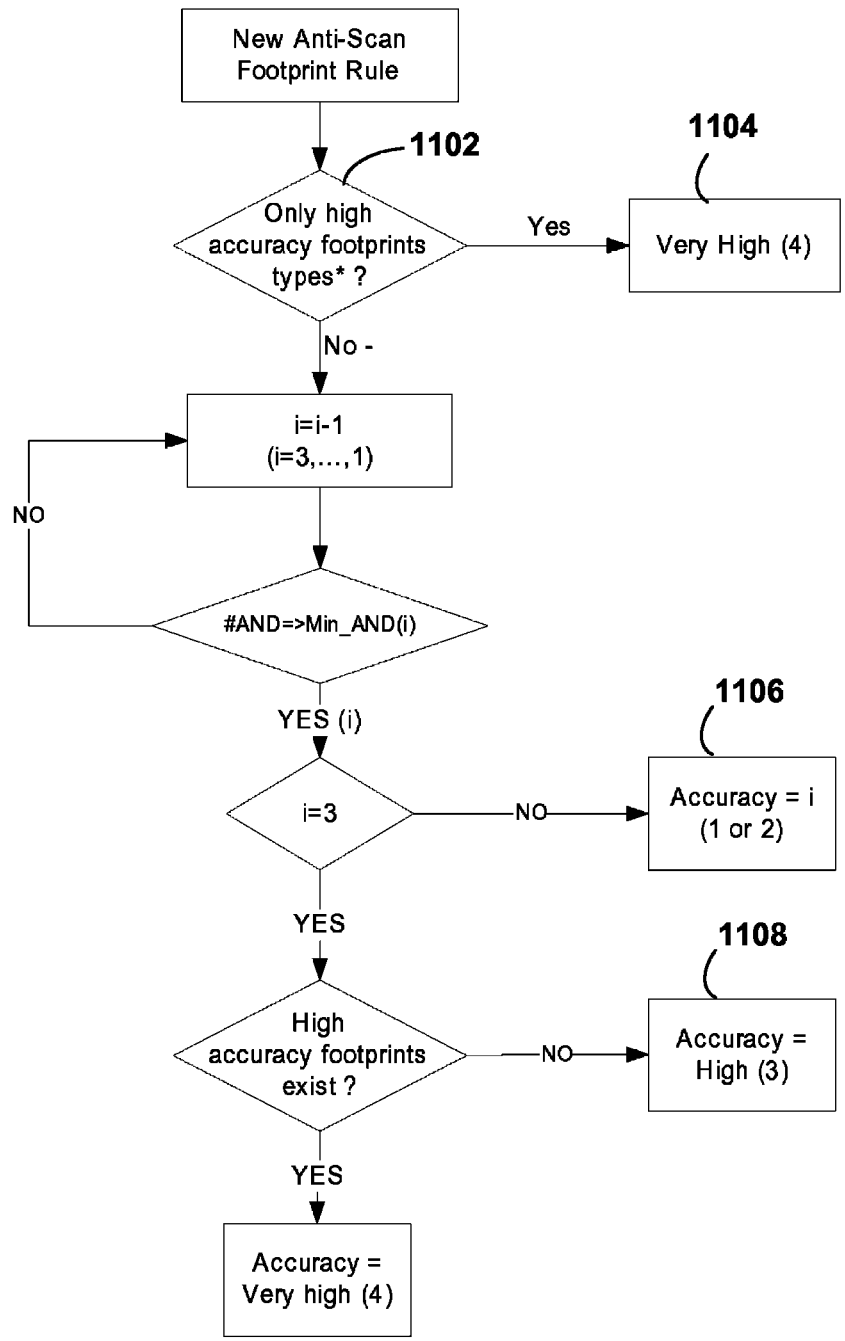
FIG. 11 illustrates how the network scan signature accuracy score is calculated.

FIG. 11 illustrates how the accuracy score is calculated. High accuracy footprints types are specified in Tables 6-8 (e.g., TCP sequence number, IP identification number etc). The flow of FIG. 11 is presented below:

a. The system in step 1102 checks if the footprint rule includes only "high accuracy footprint types," and if so, the footprint accuracy score is set to 4 (Very high) 1104. If not, then, b. The system checks the lowest strictness level that is associated with the footprint rule. There are three pre-defined strictness levels (i=1, 2 or 3). Level 3 is the highest strictness level).

c. In case i<3, the system, in step 1106, assigns accuracy level according to (i), i.e., Very low or Medium d. In case i=3, then the system checks, in step 1108, if the footprint rule includes at least one "high accuracy footprint type." If it does include at least one "high accuracy footprint type," then the system, in step 1109, sets (i) to 4, i.e., Very high accuracy level. If it does not include at least one "high accuracy footprint type," then the footprint's rule accuracy level is set, in step 1110, to 3. i.e., High. Strictness profiles will be set as shown below in Table 9:

TABLE 9

| i | Strictness profile | Minimum AND's | Comment |
|---|---|---|---|
| 1 | Low | 1 | |
| 2 | Med | 2 | |
| 3 | High | 3 | |
| 4 | Very High | 3 | With only high accuracy footprint types |

It should be noted that:

1. Worm (scan) footprint rules can include OR logical relationships between destination IP and Ports numbers. The number of OR's are ignored in the process of accuracy characterization (i.e., strictness level doesn't include OR limitations).
2. Strictness profiles don't count the first (default) AND relationship between the source IP and L4 protocol type in the Anti-Scan's footprint rule.

Generality flag—Together with the accuracy score, the worm's footprint rule is assigned with a flag that represents the level of its generality. There are three generality levels:

1. Generic (g)—Totally generic rule. This means that the attack footprint can be effective for all networks that are registered in the "automatic signature propagation service."
2. Generic/source (s)—The generality of the worm footprint rule is limited to a source network (the generic signature includes a source IP address). This signature is effective only in blocking attack traffic that originates in the same source IP address as specified by the agent device that created the attack footprint rule (i.e., same attack from other sources will not be blocked). This option can fit the requirements of large internal networks.
3. Generic/target (t)—The generality of the worm footprint rule is limited to a target network (the generic signature includes destination IP address(es)). This means that the attack footprint is relevant only for certain networks such as:
   a) Multiple devices that protect a few internet links of the same target network.
   b) Multiple devices located in the internal network, or in the internet gateway of the same network and/or in the upstream (e.g., ISP) that provides the Internet services to the same target network (i.e., all protect the same network IP range).
   3. Both (b)—The generality of the footprint rule is limited to a combination of certain target and origin networks.

Worm characteristic level—The footprint rule is assigned with a worm characteristic level according to the existing footprint types:

1. High—high probability that the attack footprint represents worm propagation activities.
2. Medium—medium probability.
3. Low—The attack footprint represents network scanning tool (not a worm).

It should be noted that this worm characteristic level, even if set to high, doesn't insure that the detected attack contains worm propagation. However, when the characteristic is set low, one can be "confident" that the detected network scan isn't associated with a worm activity.

Figure 12:
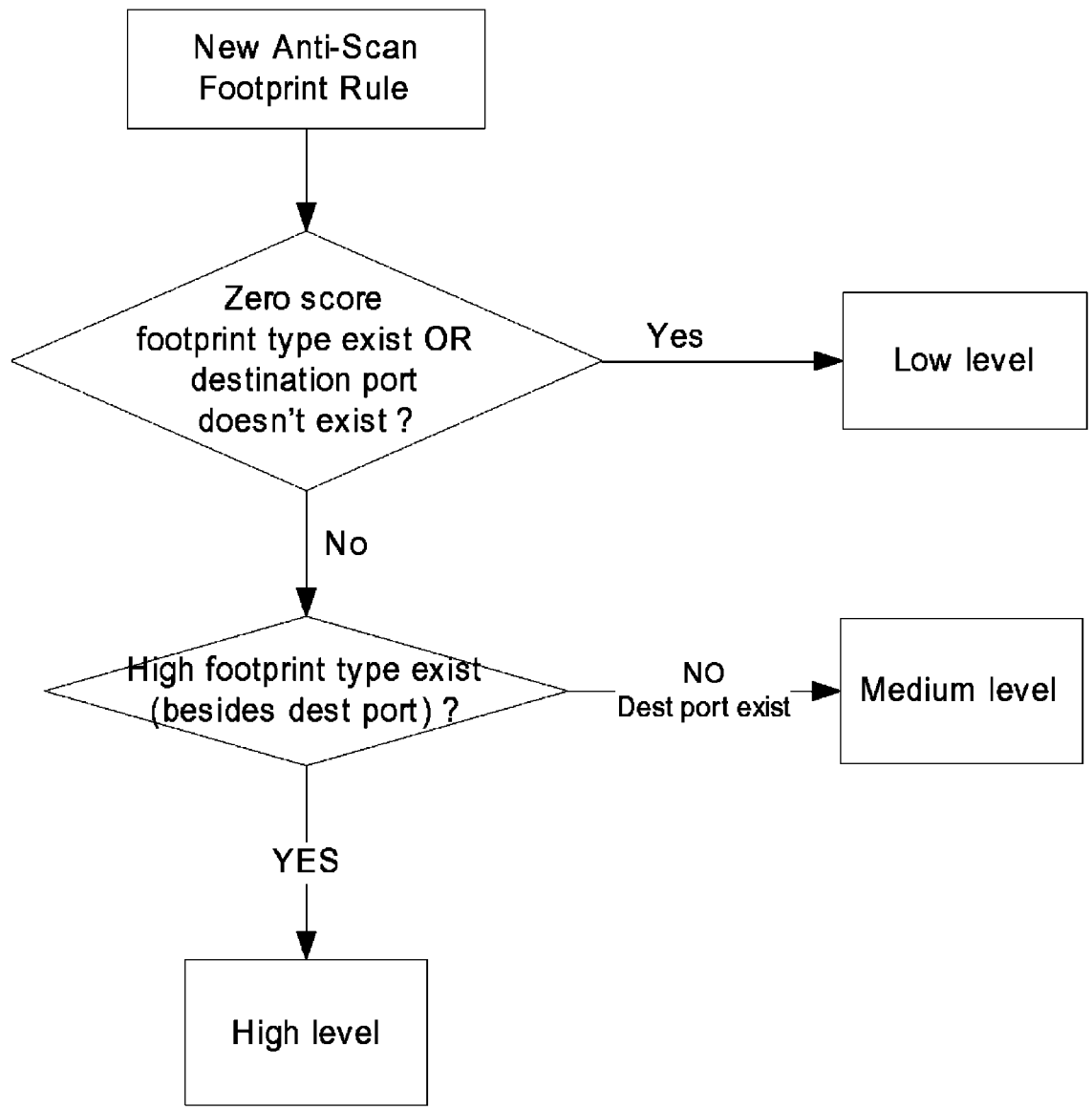
FIG. 12 illustrates an anti-scan worm characterization process.

FIG. 12 illustrates the Anti-scan worm characterization process. The flow chart of FIG. 12 illustrates rules that are used in order to decide about the worm characteristic level.

Attack direction—An attack direction flag will be assigned to each footprint rule. Possible values are: Inbound, outbound and N/A (not applicable).

Figure 13:
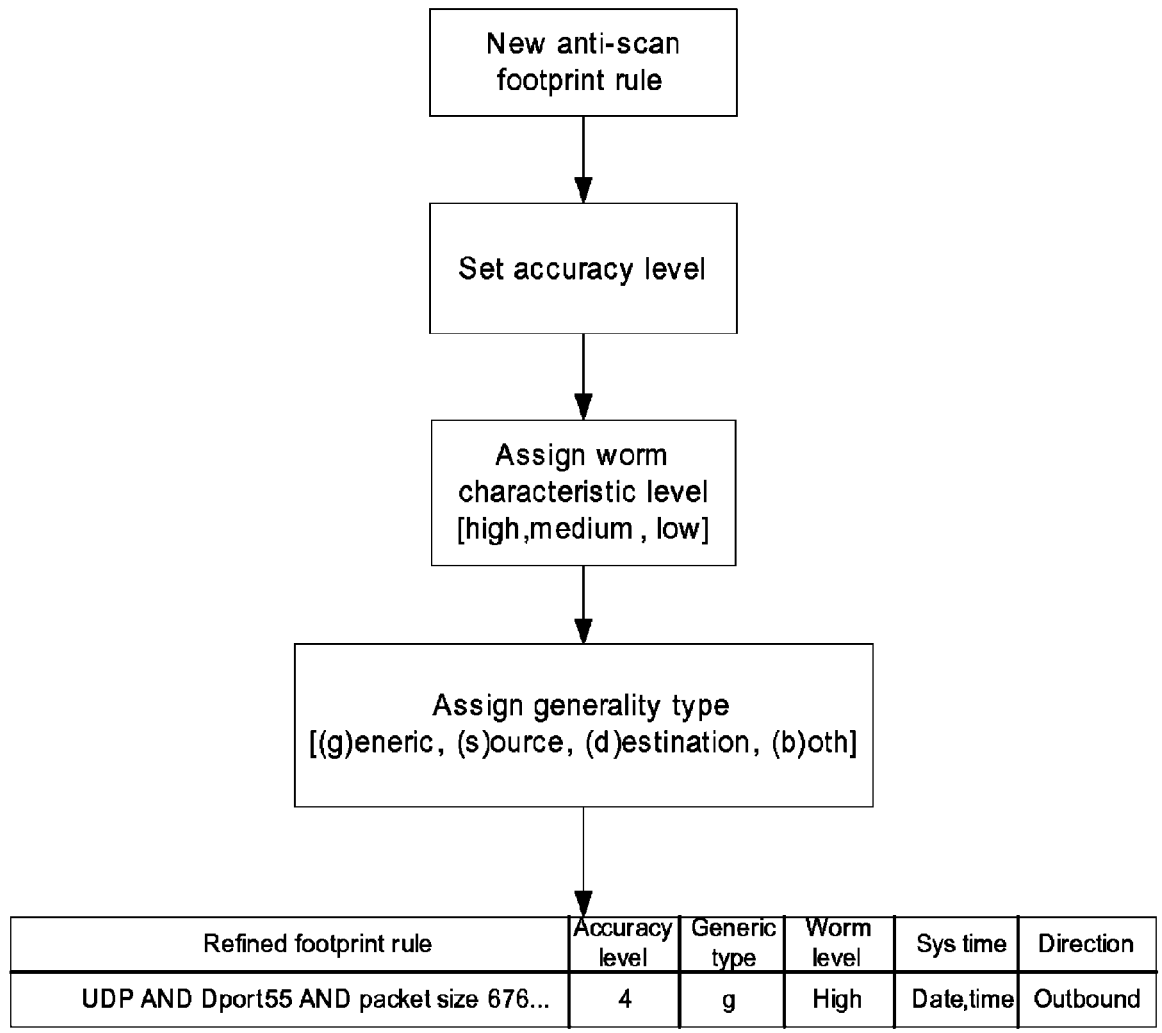
FIG. 13 summarizes the above-mentioned anti-scan footprint rule characterization process.

FIG. 13 summarizes the above-mentioned anti-scan footprint rule characterization process. It should be noted that attack system time will be assigned to each new generic signature.

Generic Signatures Black List

This generic signatures black list includes all automatic generic signatures generated by the B-DoS and Anti-scan modules and were delivered through the external generic signature update interface.

The generic signatures black list filters are divided into two filter types:

1. B-DoS generic signature filter
2. Anti-Scan generic signatures filters

Each list maintains its own generic signatures. Each signature is maintained in one of three states: block state, detection state and trace state.

Block state: during block state, packets that match the signature will be dropped and an alert will be raised.

Detection state: During detection state, packets that match the signature will be forwarded and an alert will be raised.

Trace state: In this state, statistics information is gathered per generic signature. Statistics information includes: packets per second, bytes per second and direction (inbound/outbound). These statistics are sent (typically every 60 seconds) to the controller. The controller will use these statistics for attack trace analysis purposes—Trace analysis will be defined later on.

The duration in which a signature is kept in each one of the states (block, detection or/and trace) is handled by the controller (i.e., the controller actually maintains the signatures states).

Trace State Signatures

Trace signatures are used to detect the route and source (or the nearest detectable source) of the attack.

According to configuration, the controller will decide if to send a generic signature to other device agents with a "trace state." Trace state time-out is controlled by the controller.

Trace State Rules

Each trace generic signature is assigned with two counters: PPS [Packet per Second] and Bps [Bytes/sec]. These counters are incremented upon each signature hit.

Every predefined time interval (default: 60 seconds), the average of PPS and Bps will be sent to the controller.

In case that the number of Bps or PPS (in one second interval) breaches a certain threshold ($Th_{Trace}$), the agent device will send immediately to the controller an "urgent" trace message that includes the last second counters and the updated counters' average.

It should be noted that:

Currently, trace signatures refer only to B-DoS (i.e., DoS and DDoS floods) attack filters.

A generic signature can be simultaneously in two states such as: trace state and block state or trace and detection state (the controller can decide about that).

The controller can decide if to remove a signature from the trace state and add it to block state. This process will be further explained later in the propagation rules section.

$Th_{Trace}$ will be calculated per trace signature as follow:

$$Th_{Trace}^{PPS} = dist[\%] \times (PPS_{FILTER})$$

$$Th_{Trace}^{Bps} = dist[\%] \times (Bps_{FILTER})$$

where, dist=Portion percentages [1-100%]—Configurable parameter.

$PPS_{Filter}$=The number of packets per second that was assigned to the generic signature in the agent device that created it (i.e., attack rate in packets per second).

$Bps_{Filter}$=The number of bytes that were assigned to the generic signature in the agent device that created it (attack rate in Bytes per second).

The condition will be checked every one second as follow: If $$Bps => Th_{Trace}^{Bps} \text{ OR } PPS => Th_{Trace}^{PPS}, \text{ then,}$$

send "urgent" trace statistics message to the controller, else, return.

Generic Signature List Time-Out

The generic signature list inside each agent device will be supported by an internal expiration mechanism, i.e., all generic signatures will be removed after a pre-defined time-out.

The time-out mechanism will be activated only when there is a failure to communicate with the controller (i.e., no reply from the primary and secondary controllers—the controller operations are described later on). The time-out will be reset when the communication with the controller is re-established.

Blocking Rules

Rate-Limit (Manual)

Block state includes rate-limit blocking mechanism (PPS rate limiting). Rate limit can be configured manually per each generic signature and, globally, for all generic signatures that are from the same type (i.e., DoS/DDoS generic signatures and Anti-scan/worm generic signatures). Full blocking is implemented when rate-limit value is set 0 (the default value).

Automatic Rate-Limit

This mechanism automatically sets the rate-limit value according to the generic signature characteristic parameters. Rate-limit values will be typically set as per Tables 10-11 below:

TABLE 10

| Anti-Scan Signatures (optional mechanism) | | | | |
|---|---|---|---|---|
| Signature's characteristic parameter | Low | Medium | High | Very High |
| Worm level | 100 PPS | 10 PPS | 0 PPS | — |
| Accuracy level | 100 PPS | 50 PPS | 10 PPS | 0 PPS |

In case that the rate-limit values are not the same (e.g., Worm level=medium and Accuracy level=Low), the maximum value between the two will be set.

TABLE 11

| B-DoS signatures | | | | | |
|---|---|---|---|---|---|
| Signature's characteristic parameter | Very Low | Low | Medium | High | Very High |
| Accuracy level | 1000 PPS | 500 PPS | 100 PPS | 10 PPS | 0 PPS |

It should be noted that:

Above values in tables 10 and 11 are for illustration only.

In one embodiment, an option to configure the rate-limit value per characterization parameter is implemented.

In case that both manual and automatic rate limit options are enabled, the rate limit value will be set according to the higher value between the two.

The motivation behind the automatic rate limit is to set lower rate limit values (i.e., more intensive mitigation) as long as the generic signature is assigned with higher accuracy level or higher worm characteristics score/level. Otherwise, the system will use more "gentle" mitigation actions (i.e., higher rate limit values which means less intensive blocking).

Generic Signature Propagation

Signature propagation is enabled through the controller. Each agent device is configured to send generic signatures to the controller which is responsible for distributing the signatures to other devices according to a pre-defined propagation rules. Propagation rules are configured in the controller.

In order to make the configuration process easier, default propagation rules profiles are implemented in the controller. Each profile represents a different generic signature propagation scenario. Customization of the existing profiles' rules and the creation of new profiles are within the present invention.

Signature Propagation Flow

Figure 14:
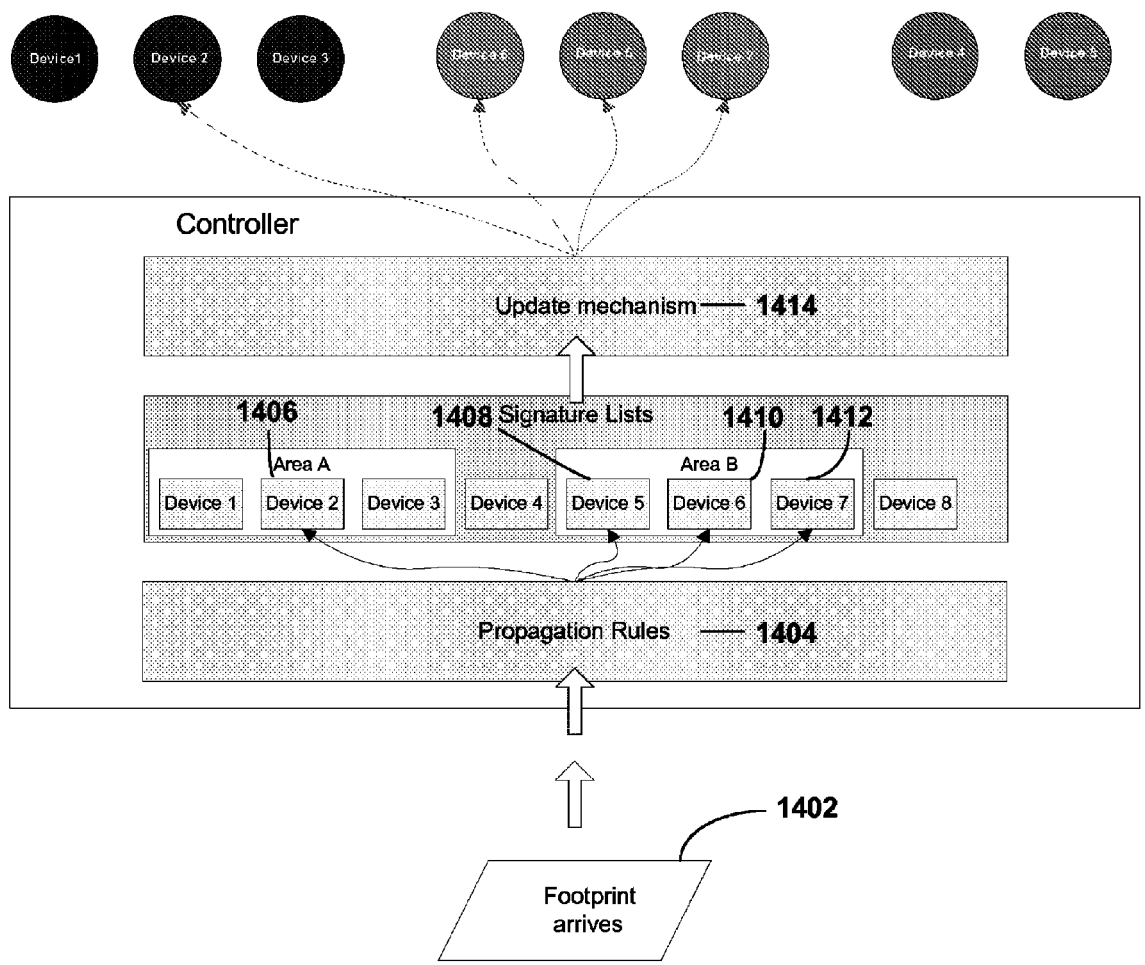
FIG. 14 illustrates a signature propagation flow.

FIG. 14 illustrates signature propagation flow as per the teachings of the present invention. When a new generic footprint 1402 arrives to the controller, it is checked through the propagation rules 1404. In case that the footprint's characteristics comply with the rule's conditions, an action is applied. The action specifies which generic signature list(s) should be updated with the new generic footprint. It should be noted that a new footprint can comply with more than one propagation rule.

The controller updates the relevant generic signature list(s) and sends it to the relevant agent device(s). In the case shown in FIG. 14, the controller updates signature lists 1406, 1408, 1410, and 1412 for agent devices 2 and 5, 6, and 7, respectively. Next, update mechanism 1414 communicates this information with appropriate agent devices (in this case, device 2, device 5, device 6, and device 7).

Messages (Protocol)

The following section defines the messages sent from and to the controller.

Table 12 below lists the agent device messages (messages that are initiated by the agent device).

TABLE 12

| # | Direction: Message type | Content | Interval/trigger |
|---|---|---|---|
| 1 | Agent to Controller: New signature update | 1. Message ID<br>2. System time (GMT time)<br>3. Agent's source IP (area code if exist)<br>4. Filter (including all characteristics)<br>5. Filter type (Anti scan or B-DoS) | Sent upon filter creation |
| 2 | Controller to Agent: New signature reply | 1. Message ID<br>2. System time (GMT time)<br>3. Status (ok, error)<br>4. Filter status (new/exist)<br>5. Unique filter ID | |
| 3 | Agent to Controller: Periodic trace stat update | 1. Message ID<br>2. Agent's source IP (area code if exist)<br>3. System time (GMT time)<br>4. Filter unique ID<br>5. Trace stat (PPS, bps) | Predefined period (default of 60 sec) |
| 4 | Agent to Controller: "Urgent" trace stat update | 1. Message ID<br>2. Agent's source IP (area code if exist)<br>3. System time (GMT time)<br>4. Filter unique ID<br>5. Trace stat (Average and last second PPS and bps) | Upon event |
| 5 | Controller to Agent: Trace reply | 1. Message ID<br>2. System time<br>3. Status (ok, error)<br>4. Filter unique ID | |
| 8 | Agent to Controller: Keep alive update | 1. Message ID<br>2. System time (GMT time)<br>3. Agent's source IP (area code if exist)<br>4. Signature list cookie<br>5. IDS version<br>6. Protocol version | Predefined period (default 60 sec) |
| 9 | Controller to Agent: Keep alive reply | 1. Message ID<br>2. System time<br>3. Status (ok, error)<br>4. Signature list update (if needed according to cookie).<br>5. New cookie | |
| 10 | Agent to Controller: Full signature list request | 1. Message ID<br>2. System time (GMT time)<br>3. Agent's source IP<br>4. IDS version<br>5. Protocol version | Upon configuration request |
| 11 | Controller to Agent: Full list reply | 1. Message ID<br>2. System time<br>3. Status (ok, error)<br>4. Last updated signature list<br>5. Cookie | |

Upon arrival of a new signature, the controller assigns to it a unique ID.

Figure 15:
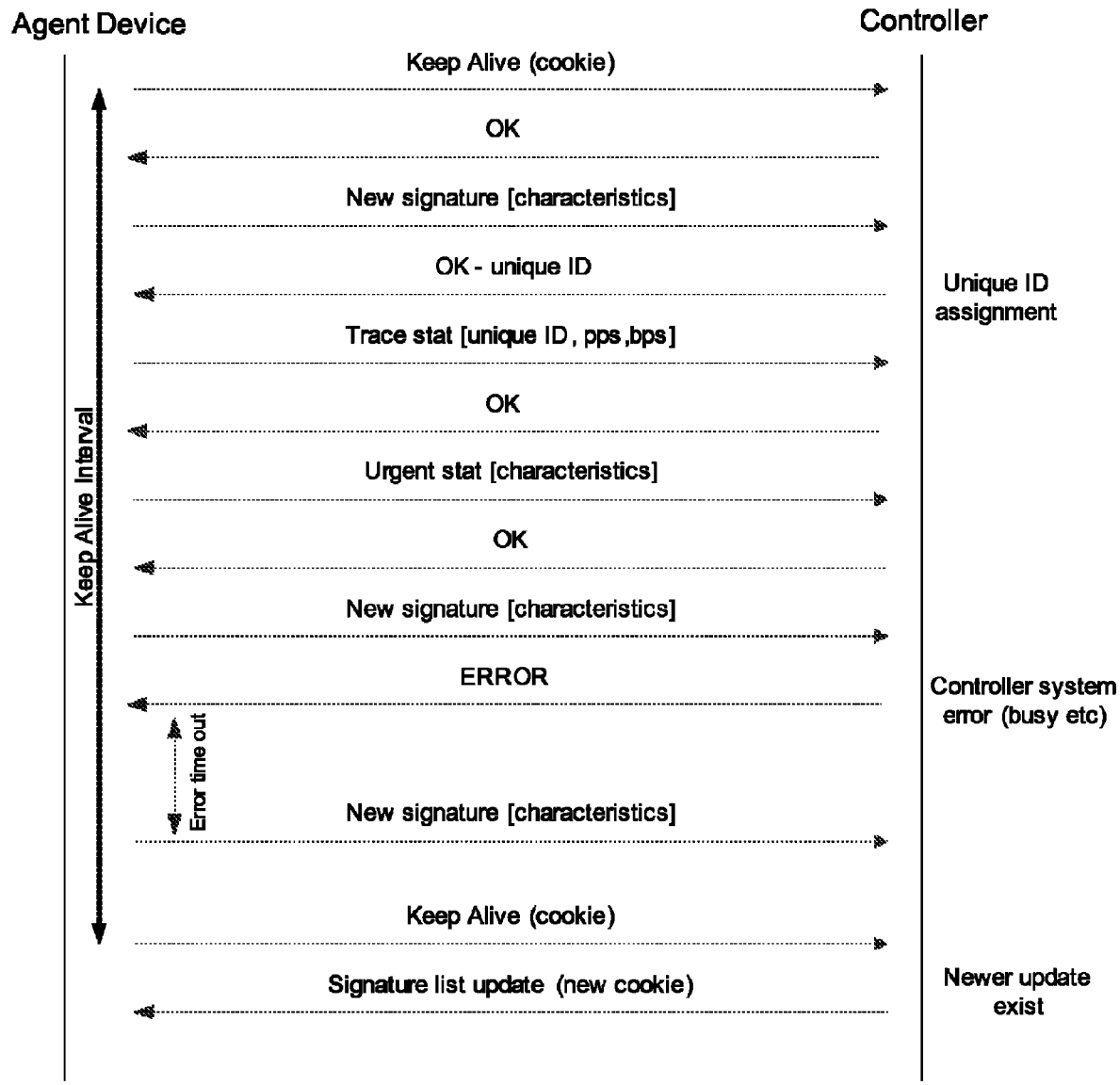
FIG. 15 illustrates a timing diagram outlining a typical agent device-controller message exchange.

FIG. 15 illustrates a timing diagram outlining a typical Agent device—Controller message exchange.

Agent Device Message Sequence

When an agent device is going up (i.e., after a boot sequence) and in case that the generic signature propagation feature is enabled, it will start sending keep alive messages to the primary controller.

The agent device maintains messages retransmit mechanism for the new signature message and "urgent" trace statistics message. This mechanism includes a retransmit timeout (RTO). Default RTO will be 15 seconds.

In case that the RTO is expired or in the case of a controller error message (i.e., error is treated as no reply) the agent device will retransmit the last message. In case that the number of retries exceeds a pre-defined limit (default of 3), the RTO will be extended (e.g., 60 seconds). The RTO will be set to its default value after the message is acknowledged by the controller.

It should be noted that:
  RTO and number of retries can be defined through configuration (in the agent device).
  Because of NAT/proxy issues, all messages should include (in application payload) the source IP addresses of the agent device in the message content.
  Specifying the unique signature ID inside the controller reply messages is optional.

Table 13 outlines the controller messages (messages that are initiated by the controller).

TABLE 13

| # | Direction: Message type | Content | Interval/trigger options |
|---|---|---|---|
| 1 | Controller to Agent: Signatures list update | 1. Message ID<br>2. System time (GMT)<br>3. New filter list (cookie)<br>4. Signature's state [Block, detection] - the state is specified per signature. | a. Upon each modification to the signature list.<br>b. Non-updated agent device (i.e., old cookie)<br>c. Agent device full signature list request |

TABLE 13-continued

| Direction: # Message type | Content | Interval/trigger options |
| --- | --- | --- |
| 2 Agent to Controller: New list reply | 1. Message ID 2. System time 3. Status (ok, error) | |
| 3 Controller to Agent: Trace signatures list update | 1. Message ID 2. System time (GMT) 3. New trace list (cookie) | a. Upon each modification to the trace signature list b. Non-updated agent device (trace cookie check) c. DP device trace signature list request |
| 4 Agent to Controller: Trace update reply | 1. Message ID 2. System time (GMT) 3. Status (ok, error) | |

Figure 16:
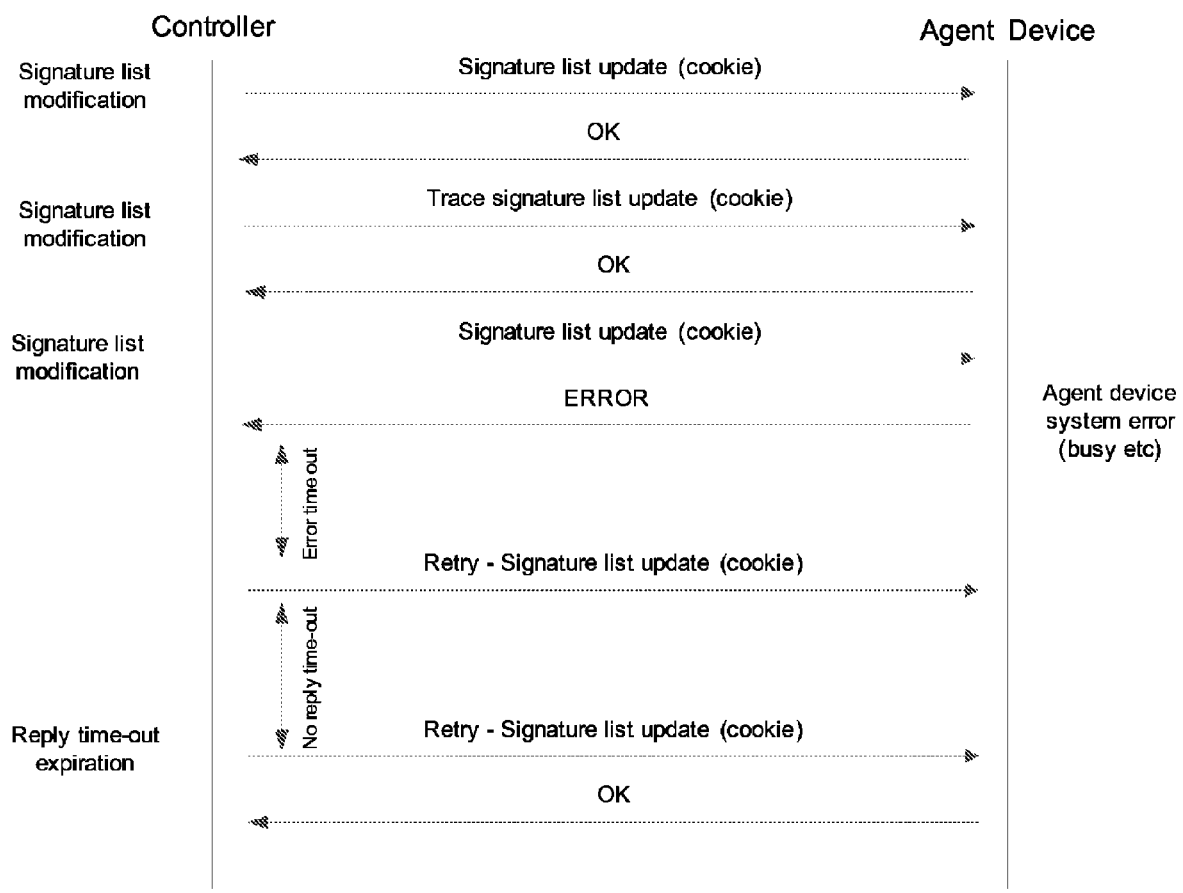
FIG. 16 illustrates a timing diagram outlining the Controller's message exchange.

FIG. 16 illustrates a timing diagram outlining the Controller's message exchange.

It should be noted that:

Retransmit mechanism—RTO and number of retries will be defined in the controller (configurable). In case of error reply from the agent device, the same retransmit mechanism will be used (i.e., error will be treated as no reply).

Retransmit process will stop after pre-defined retries.

In case the controller is in the procedure of sending retries messages to the agent device (following agent device error reply or non-reply) and the associated signature list is updated in the same time, then the controller will reset the retries counter (i.e., allowed number of retries) and will send the updated signature list.

Cookies

There are two types of signature lists that are maintained in the controller. One is the trace signatures and the other is the block signatures. The block signature list includes signatures that are in a block or detection state. These signature lists are supposed to reflect the signatures list at each agent device (i.e., a copy).

In case a new signature is added to the signature list of one or more agent devices (according to a pre-defined propagation rules in the controller), the controller sends an updated signature list to the relevant agent device(s). The signature list update includes all signatures including the new one(s). The agent device that receives the updated list will insert the new signatures, remove non-existing signatures and will ignore signatures that are already exist in his own list (these will be identified according to the filter unique ID).

Each new update message includes a cookie. The cookie's value is an identifier of the current (last updated) signature list that is associated to a specific agent device. In case that the agent device sends a keep alive message without the last cookie value that is set in the controller, then the controller will send the last update message again.

Each agent device starts with an "initial" cookie value (e.g., zero). This value is run over by the first cookie value that is sent from the controller.

It should be noted that:

The controller maintains a separate signature lists and cookie values per each agent device.

The controller maintains a separate signature lists for block/detection signatures and trace signatures (i.e., also two cookies).

Signature Blocking Time-Out

The controller is responsible to maintain an oblivion period for each one of the signatures per signature list.

The oblivion period insures that the signature list maintains signatures during attack outbreaks and automatically removes them, gradually through a transit in a detection state, when they become less relevant (i.e., when the attack outbreak become remote in time). The following time-out mechanism is supported in the controller:

Block/Detection States

Figure 17:
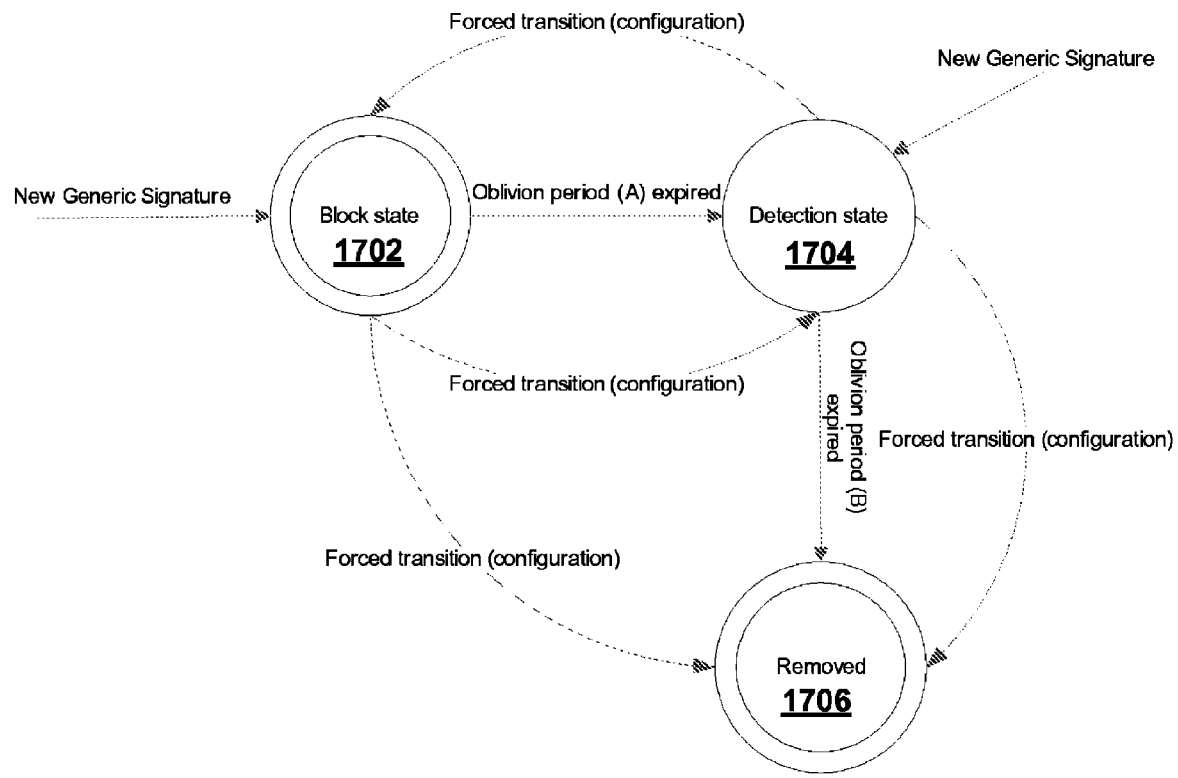
FIG. 17 illustrates generic signature "blocking" states and transition rules, wherein the signatures states are controlled by the controller.

FIG. 17 illustrates generic signature states (i.e., block state 1702, detection state 1704, and removed 'virtual' state 1706) and transition rules.

It should be noted that:

Oblivion periods (A and B) are configurable per filter type (i.e., Anti scan and B-DoS generic signatures).

Transition from state to state can be forced through configuration (per filter in the signature list)

Any transition to block or detection states initializes the oblivion period.

In case oblivion period (A or B) is expired, the generic signature will be removed and a new cookie will be generated for the associated generic signatures list.

In case of that the generic signatures have allocated all available memory, the "oldest" signature in the list will be automatically removed.

Trace State

Figure 18:
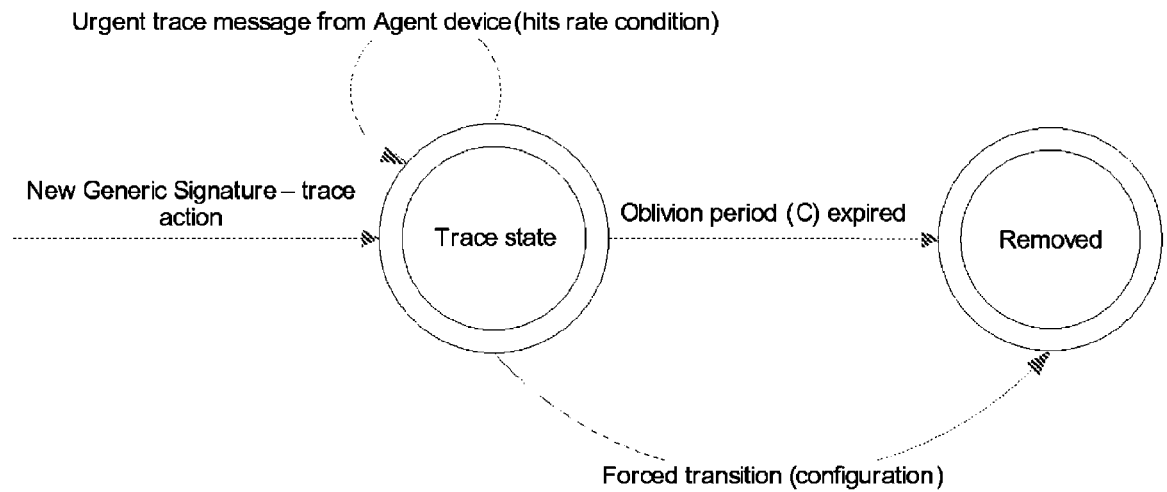
FIG. 18 illustrates generic signature trace states and the transition rules, wherein the signature states are controlled by the controller.

FIG. 18 illustrates generic signature trace states and the transition rules. Trace signatures are used to detect the route and source (or the nearest detectable source) of the attack. According to configuration, the controller will decide if to send a generic signature to other agent devices with a "trace state" action. Trace state time-out (oblivion period C) is defined according to configuration (the default time-out is shorter than the block and detection states' time-out).

Trace state rules:

a) In case oblivion period (C) is expired, the generic signature will be removed and a new cookie will be generated for the associated generic signatures list.

b) The controller receives periodically (every 60 seconds) trace statistics messages from the agent device. In case that an "urgent" trace update was received, then the oblivion period (C) of the associated generic signature will be renewed.

It should be noted that currently, trace signatures refer only to B-DoS attacks filters (i.e., DoS/DDoS).

Registration and Recovery

Any agent device that "wants" to be part of the automatic signature propagation network is registered at the controller.

Registration is done through configuration in the controller and in the agent device.

The agent device is configured with the IP address of the primary and secondary controllers.

The primary controller is configured with the agent's IP address and an area code that the device is belonged to (area code configuration is optional).

Upon registration, the agent device sends keep-alive messages with an initial cookie value. The controller sets the agent as an active device and, in case that there are pending signatures associated with this device, sends a signature list update message.

The controller maintains a distribution list that includes all registered agent devices and distributes the newly generated signatures only to active devices according to a pre-defined propagation rules.

In case an agent device is detected to be down for some reason (this will be identified according to keep-alive timeout), the controller changes the status of this device to "inactive" and will stop sending messages to this device. The controller will set the device back to active when a keep-alive message is identified again.

Figure 19:
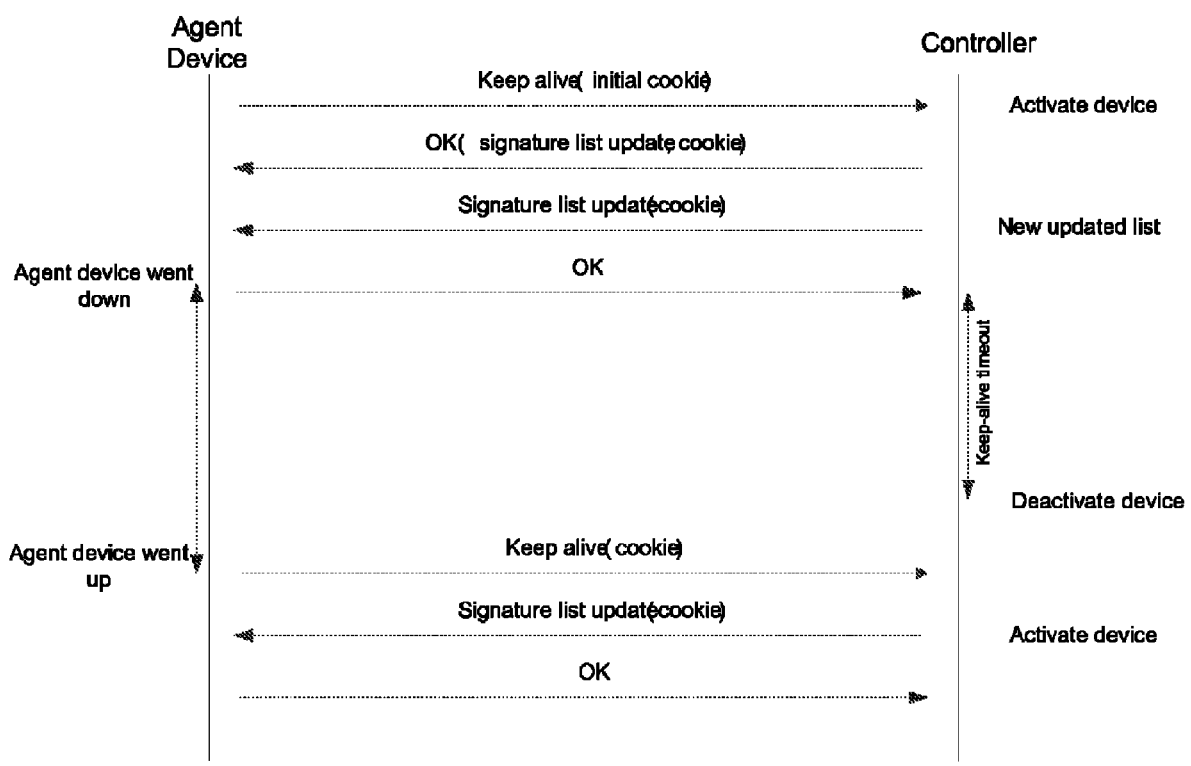
FIG. 19 illustrates a timing diagram showing the registration process between an agent device and a controller.

FIG. 19 illustrates a timing diagram showing the registration process between an agent device and a controller.

Controller Backup (Active-Passive)

In order to maintain high availability capabilities, the signature propagation mechanism may be supported by two controllers, i.e., a primary controller and secondary (back up) controller.

The secondary controller maintains a copy of the distribution list, propagation rules and generic signature lists of the primary controller. The primary and secondary controllers are synchronized in a pre-defined interval and upon any change in the primary controller. Each agent device is configured with the IP addresses of both primary and secondary controllers.

Keep-Alive

The communication mechanism between the primary and secondary controllers includes keep-alive messages that are sent from the primary to the secondary. In case that a keep-alive time-out is expired, the secondary is set to be the primary controller. In this case a message that updates all agent devices about the new primary device is sent by the new primary controller (e.g., set secondary to primary command).

Figure 20:
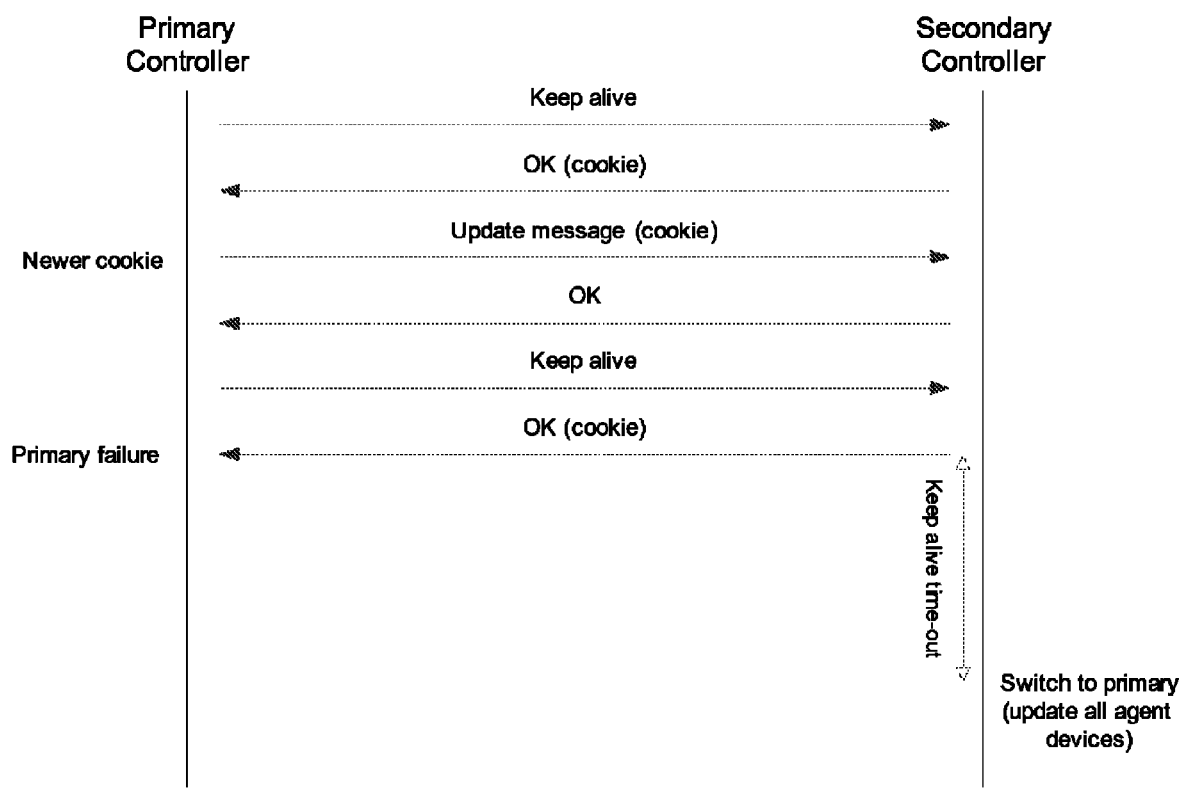
FIG. 20 illustrates a timing diagram showing the interaction between the primary and secondary controllers.

FIG. 20 illustrates a timing diagram showing the interaction between the primary and secondary controllers.

In order to keep both signature lists (in the primary and secondary) synchronized, the agent device will never send a new generic signature message to the secondary controller unless the secondary has sent a primary update message.

Figure 21:
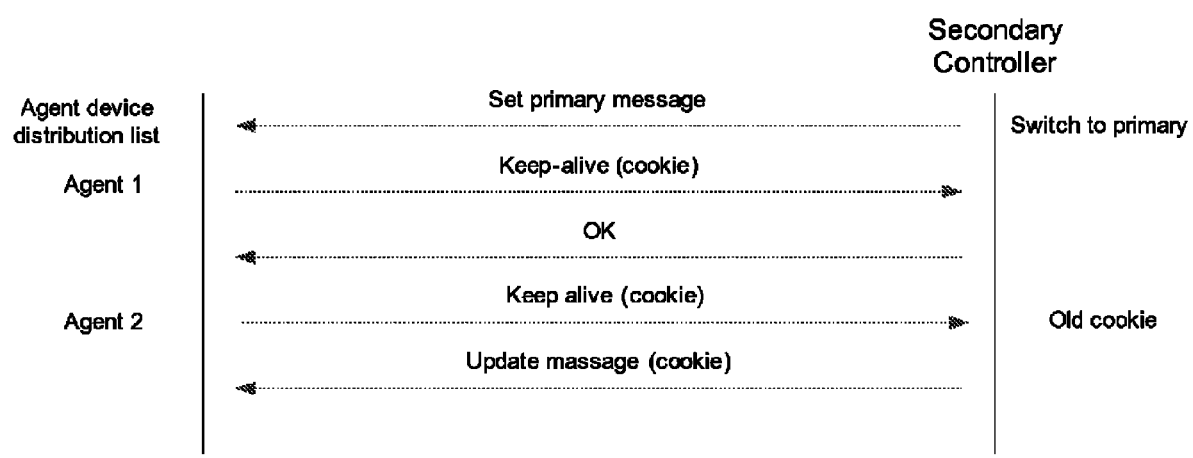
FIG. 21 illustrates a timing diagram showing an agent device and secondary controller recovery.

The agent device ignores any message that comes from a secondary device unless it is a primary update message (see FIG. 21).

FIG. 21 illustrates a timing diagram showing an agent device and Secondary Controller recovery scenario.

Primary and Secondary Controllers Update Messages

The primary controller is responsible to update the secondary device upon every change in the signature list (including a periodic update). In any case, the secondary controller replies to the primary's keep-alive message with a cookie that represents the last update. In case that the primary identifies that the cookie doesn't match the most updated one, an update message will be sent again.

Security Considerations

To avoid session hijacking and insertion of fake signatures and distribution lists, all communication channels between the automatic signature propagation network components may include tight authentication mechanisms.

Signature Lists

The controller maintains a signature list per registered agent device. Each signature list reflects the generic black list in the associated agent device.

The signature list includes the following parameters:
1. agent IP address
2. Area code
3. Cookie
4. Generic signature lists (trace and block lists)
    a. Generic signature and its associated characteristics
    b. unique ID per generic signature
    c. Signature state: block or detection (trace signature has only one state)
    d. Generic signature time-out Through these lists, the controller will be able to control the propagation of a signature to each agent device.

Propagation Rules

Propagation rules are configured in the controller. It is possible to configure basic and advanced propagation rules as follow:

Basic Propagation Rules

A basic propagation rule follows the format shown in Table 14:

TABLE 14

| | From | | | | | | Actions | | |
|---|---|---|---|---|---|---|---|---|---|
| Rule # | IP | device Area | Filter type | Accuracy Level | Worm Level | Generic type | Direction | Distribution IP range | Distribution area | Filter State |
| 1 | | B | B-DoS | =>L | =>M | g OR s | Inbound | 10.0.0.1-10.0.0.5 | A | Block | a) Rule #—Rules are checked in order of their rule number.

Rule Conditions b) From device—This field specifies the agent device that has created the generic signature. Code area* or/and IP address should be specified in this field.
c) Filter type—Type of filter that this rule applies to. Possible values are B-DoS or Anti-Scan.
d) Accuracy level—The generic signature accuracy level that this rule applies to. Possible values are from very low to very high (depends on the filter type). Possible operators are: =>, = and =<.
e) Worm level—The worm level that this rule applies to. Possible values are Low, medium and high. Possible operators are: =>, = and =<.
f) Generic type—the generic type that this rule applies to. Possible values are source, destination or generic. OR may be defined between these types, e.g., g OR s.
g) Direction—Attack direction that this filter was associated with at the time it was created in the agent device. Possible values are inbound, outbound, inbound OR outbound or N/A (Not Applicable).

Rule Actions h) Actions—The actions that should be taken in case all filter parameters have met the rule criteria. Possible actions are:
    1. Add to distribution list—specify the range of IP addresses (or area code) of the agent devices that the signature should be propagated to.
    2. State—The specific signature action that should be taken in each agent device.

Possible values are: trace block or detection.

*Area Code—The area code represents the protected network area from which the new generic signature rule has been generated (i.e., the network, cluster or any other virtual area in which the agent device was deployed in).

It should be noted that the area code is a group of agent devices. It is configured in the controller (i.e., associate agent device IP addresses with an area code). This area code is part of the propagation rules between agent devices (e.g., between network areas).

Advanced Propagation Rules

Advanced propagation rules will allow the network manager to configure rules that will, first, track attacks to their nearest source (i.e., through trace signatures) and then, according to the trace results, will distribute or switch signatures from a trace state to a block state only in the most relevant agent devices (i.e., devices that were discovered to be the most effective "mitigators"). The nearest source will be determined automatically according to the activity level of each trace signature.

Another advanced option is to allow adding additional footprint types and values into an existing generic signature (only through AND logical expression). This option is called 'generic signature modification' advanced rule.

Table 15 below depicts the advanced propagation rule format (generic signature modification):

Manual Propagation Rules

An option to choose a generic signature from any one of the generic signature list and to push it to any agent device is included as well (regardless to the existing propagation rules).

Propagation Profiles

Horizontal Inbound Propagation Profile

Figure 22:
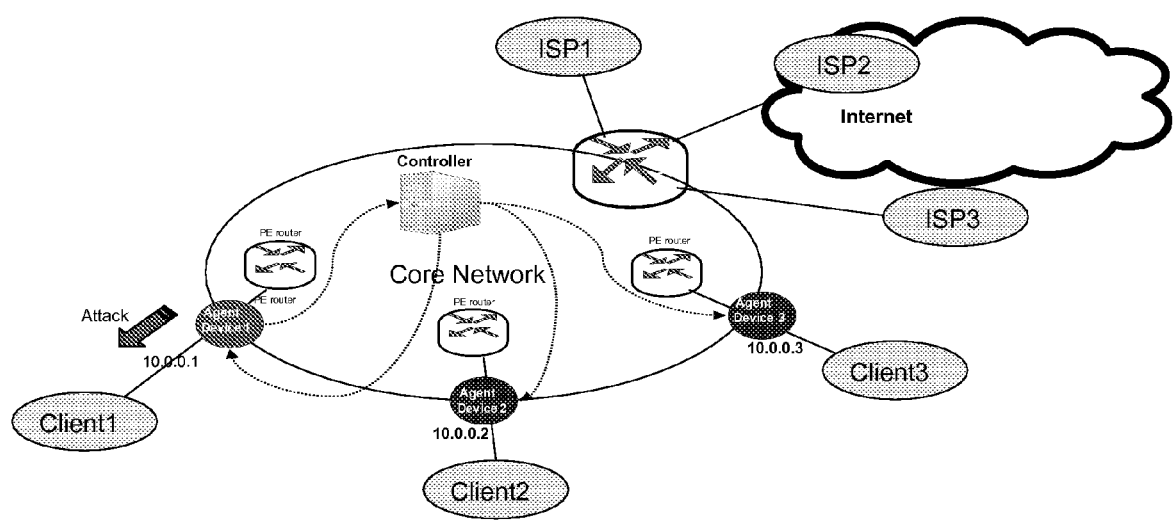
FIG. 22 illustrates a horizontal signature propagation scenario (carrier environment).

FIG. 22 illustrates a horizontal signature propagation scenario (e.g., carrier/ISP environment). The profile includes examples of both propagation rules and typical agent device configuration parameters.

The following propagation rules in Table 17 is part of the pre-defined horizontal inbound propagation profile:

TABLE 15

| | From device | | | | | | Advanced actions | | | |
|---|---|---|---|---|---|---|---|---|---|---|
| Rule # | IP | Area | Filter type | Accuracy Level | Worm level | Generic type | Direction | Distribution IP range | Distribution area | Add footprint type | Filter State |
| 1 | | B | B-DoS | =>H | =>H | g | Inbound | 10.0.0.1-10.0.0.5 | A | Destination IP | Block |

Advanced propagation rule format (conditional action rules):

TABLE 16

| | From device | | | | | | Advanced actions | | | |
|---|---|---|---|---|---|---|---|---|---|---|
| Rule # | IP | Area | Filter type | Accuracy Level | Worm level | Generic type | Direction | Distribution IP range | Distribution area | Trace condition | Filter State |
| 1 | | B | B-DoS | =>H | =>H | g | Inbound | 10.0.0.1-10.0.0.5 | A | =>80% | Trace to Block |
| 2 | | | | | | | | | | | |

The last rule (table 16) means that a generic signature that arrived from area B agent devices and have the specified characteristics (i.e., accuracy, worm level, etc) will be added to a distribution list of agent devices in area A (10.0.0.1 to 10.0.0.5). The action is to propagate these signatures in a trace mode to area A. These generic signatures will be transited into block state case the trace condition occurs (e.g., If trace statistics=>80% attack rate, then switch to Block).

Switching from trace to block actually means that the controller should remove the signature from the trace list and add it to the generic block list (in block state).

TABLE 17

| | From device | | Filter | Accuracy | Worm | Generic | | Actions | | |
|---|---|---|---|---|---|---|---|---|---|---|
| Rule # | IP | Area | type | Level | level | type | Direction | Distribution IP range | Distribution area | Filter State |
| 1 | 10.0.0.1-10.0.0.3 | A | B-DoS | =>M | =>M | g OR s | Inbound | 10.0.0.1-10.0.0.3 | A | Block |
| 2 | 10.0.0.1-10.0.0.3 | A | Anti-Scan | =>M* | =>H | G OR s | Inbound | 10.0.0.1-10.0.0.3 | A | Block |
| 3 | 10.0.0.1-10.0.0.3 | A | B-DoS | <L | =>L | G OR s | Inbound | 10.0.0.1-10.0.0.3 | A | Detection |

In this case if agent device 1 detects an inbound attack and generated a generic signature then the signature is propagated (if it complies with all rules) to other agent devices in area A, thus creating a pro-active protection for client 2 and 3 networks as well.

The following device configuration parameters in Table 18-19 is part of the horizontal profile. Footprint types configuration parameters:

Footprint and consistency parameters are the same as in the case of the inbound profile.

Horizontal Inbound and Outbound Profile

The default profile for both inbound and outbound horizontal propagation rules is actually an aggregation of both default profile rules. See the example given below in Table 21:

TABLE 18

Inbound horizontal profile - B-DoS Footprint parameters

| # | Footprint Type | TCP configuration | UDP configuration | ICMP configuration | IGMP configuration |
|---|---|---|---|---|---|
| 1 | TCP Sequence Number | Enabled | — | — | — |
| 2 | Transport Checksum | — | Disabled | Disabled | Disabled |
| 3 | IP ID number | Enabled | Enabled | Enabled | Enabled |
| 4 | DNS ID number (port 53) | — | Enabled | — | — |
| 5 | DNS Qname (port 53) | — | Disabled | — | — |
| 6 | DNS Qcount (port 53) | — | Enabled | — | — |
| 7 | Source Port | Dynamic | Dynamic | — | — |
| 8 | Source IP address | Dynamic | Dynamic | Dynamic | Dynamic |
| 9 | ToS (Type of Service) | Enabled | Enabled | Enabled | Enabled |
| 10 | Packet Size | Enabled | Enabled | Enabled | Enabled |
| 11 | Fragment | Disabled | Disabled | Disabled | Disabled |
| 12 | Fragment offset | Enabled | — | — | — |
| 13 | Destination Port | Enabled | Enabled | — | — |
| 14 | Destination IP address | Disabled | Disabled | Disabled | Disabled |
| 15 | ICMP Message Type | — | — | Enabled | — |
| 16 | IGMP Message Type | — | — | — | Enabled |
| 17 | TTL | Disabled | Disabled | Disabled | Disabled |

TABLE 19

Inbound horizontal profile - Anti scan footprint parameters

| # | Footprint Type | TCP configuration | UDP configuration | ICMP configuration |
|---|---|---|---|---|
| 1 | TCP Sequence Number | Enabled | N/R | N/R |
| 2 | IP ID number | Enabled | Enabled | Enabled |
| 3 | Source IP address | Dynamic | Dynamic | Dynamic |
| 4 | Packet Size | Enabled | Enabled | Enabled |
| 5 | Destination Port | Enabled | Enabled | — |
| 6 | Destination IP address | Disabled | Disabled | Disabled |
| 7 | TTL | Disabled | Disabled | Disabled |

Consistency Parameters:

B-DoS: DTh=60 seconds

Anti-Scan: DTh=30 seconds, FTh=10 Hz (time between events<=0.1 sec)

Horizontal Outbound Propagation Profile

Propagation rules in Table 20 are part of the horizontal outbound propagation profile:

TABLE 20

| Rule # | From device IP | From device Area | Filter type | Accuracy Level | Worm level | Generic type | Direction | Actions Distribution IP range | Distribution area | Filter State |
|---|---|---|---|---|---|---|---|---|---|---|
| 1 | 10.0.0.1-10.0.0.3 | A | Anti-Scan | =>M* | =>H | g OR s | Outbound | 10.0.0.1-10.0.0.3 | A | Block |
| 2 | 10.0.0.1-10.0.0.3 | A | B-DoS | =>M | =>H | g OR s | Outbound | 10.0.0.1-10.0.0.3 | A | Block |
| 3 | 10.0.0.1-10.0.0.3 | A | B-DoS | <L | =>H | g OR s | Outbound | 10.0.0.1-10.0.03 | A | Detection |

TABLE 21

| Rule # | From device IP | Area | Filter type | Accuracy Level | Worm level | Generic type | Direction | Actions Distribution IP range | Distribution area | Filter State |
|---|---|---|---|---|---|---|---|---|---|---|
| 1 | 10.0.0.1-10.0.0.3 | A | B-DoS | =>M | =>M | g OR s | Inbound | 10.0.0.1-10.0.0.3 | A | Block |
| 2 | 10.0.0.1-10.0.0.3 | A | Anti-Scan | =>M* | =>H | g OR s | Inbound | 10.0.0.1-10.0.0.3 | A | Block |
| 3 | 10.0.0.1-10.0.0.3 | A | B-DoS | <L | =>L | g OR s | Inbound | 10.0.0.1-10.0.0.3 | A | Detection |
| 4 | 10.0.0.1-10.0.0.3 | A | Anti-Scan | =>M* | =>H | g OR s | Outbound | 10.0.0.1-10.0.0.3 | A | Block |
| 5 | 10.0.0.1-10.0.0.3 | A | B-DoS | =>M | =>H | g OR s | Outbound | 10.0.0.1-10.0.0.3 | A | Block |
| 6 | 10.0.0.1-10.0.0.3 | A | B-DoS | <L | =>H | g OR s | Outbound | 10.0.0.1-10.0.0.3 | A | Detection |

Vertical Inbound Propagation Profile

Figure 23:
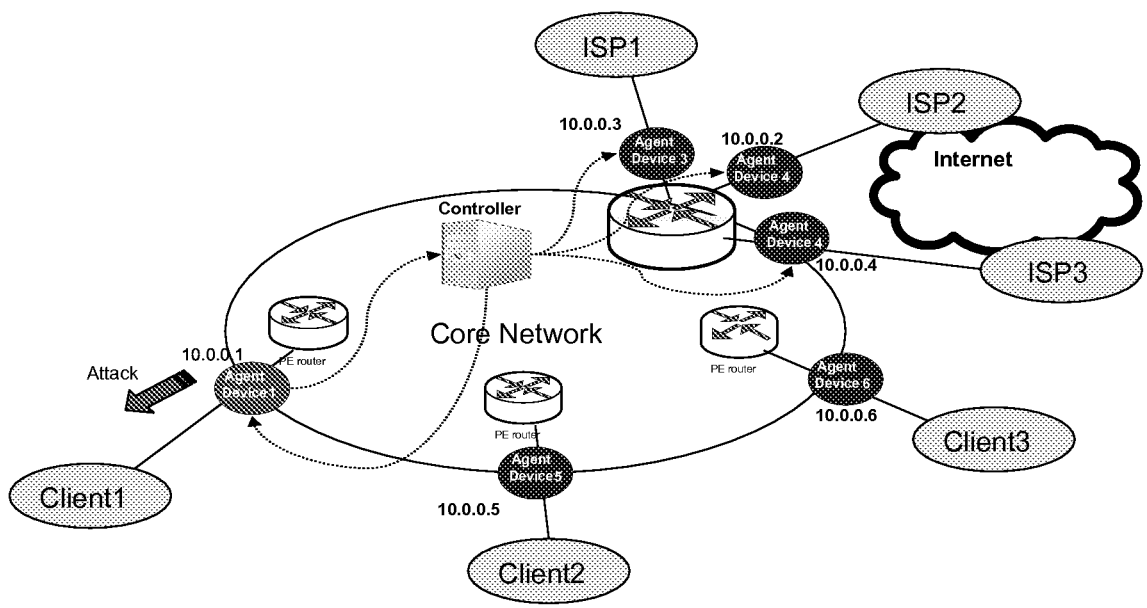
FIG. 23 illustrates the vertical signature propagation scenario (carrier environment).

FIG. 23 illustrates the vertical signature propagation scenario (e.g., carrier upstream mitigation scenario).

Propagation rules in Table 22 are part of the vertical inbound propagation profile:

TABLE 22

| Rule # | From device IP | Area | Filter type | Accuracy Level | Worm level | Generic type | Direction | Actions Distribution IP range | Distribution area | Filter State |
|---|---|---|---|---|---|---|---|---|---|---|
| 1 | 10.0.0.1, 10.0.0.5, 10.0.0.6 | A | B-DoS | =>H | =>L | g OR s | Inbound | 10.0.0.2-10.0.0.4 | B | Block |
| 2 | 10.0.0.1, 10.0.0.5, 10.0.0.6 | A | Anti-Scan | =>M | =>H | g OR s | Inbound | 10.0.0.2-10.0.0.4 | B | Detection |
| 3 | 10.0.0.1, 10.0.0.5, 10.0.0.6 | A | B-DoS | =M | =>L | g OR s | Inbound | 10.0.0.2-10.0.0.4 | B | Detection |

The vertical profile is mainly effective to mitigate attacks that were detected at the customer side (i.e., customer edge) but requires upstream mitigation (e.g., mitigation at the ISP), thus effectively preventing attacks that consume all of the customer's bandwidth resources (bandwidth consumption).

Device configuration parameters in Tables 23-24 will be part of the vertical profile.

Footprint types configuration parameters:

TABLE 23

Inbound vertical profile - B-DoS Footprint parameters

| # | Footprint Type | TCP configuration | UDP configuration | ICMP configuration | IGMP Configuration |
|---|---|---|---|---|---|
| 1 | TCP Sequence Number | Enabled | — | — | — |
| 2 | Transport Checksum | — | Disabled | Disabled | Disabled |
| 3 | IP ID number | Enabled | Enabled | Enabled | Enabled |
| 4 | DNS ID number (port 53) | — | Enabled | — | — |
| 5 | DNS Qname (port 53) | — | Disabled | — | — |
| 6 | DNS Qcount (port 53) | — | Enabled | — | — |
| 7 | Source Port | Dynamic | Dynamic | — | — |
| 8 | Source IP address | Dynamic | Dynamic | Dynamic | Dynamic |
| 9 | ToS (Type of Service) | Enabled | Enabled | Enabled | Enabled |
| 10 | Packet Size | Enabled | Enabled | Enabled | Enabled |
| 11 | Fragment | Disabled | Disabled | Disabled | Disabled |
| 12 | Fragment offset | Enabled | — | — | — |
| 13 | Destination Port | Enabled | Enabled | — | — |
| 14 | Destination IP address | Dynamic | Dynamic | Dynamic | Dynamic |
| 15 | ICMP Message Type | — | — | Enabled | — |
| 16 | IGMP Message Type | — | — | — | Enabled |
| 17 | TTL | Disabled | Disabled | Disabled | Disabled |

TABLE 24

Inbound vertical profile - Anti scan footprint parameters

| # | Footprint Type | TCP configuration | UDP configuration | ICMP configuration |
|---|---|---|---|---|
| 1 | TCP Sequence Number | Enabled | N/R | N/R |
| 2 | IP ID number | Enabled | Enabled | Enabled |
| 3 | Source IP address | Dynamic | Dynamic | Dynamic |
| 4 | Packet Size | Enabled | Enabled | Enabled |
| 5 | Destination Port | Enabled | Enabled | — |
| 6 | Destination IP address | Disabled | Disabled | Disabled |
| 7 | TTL | Disabled | Disabled | Disabled |

Consistency Parameters:
B-DoS: DTh=60 seconds
Anti-Scan: DTh=30 seconds, FTh=10 Hz (time between events<=0.05 sec)

Vertical and Horizontal Inbound Propagation Profile

Figure 24:
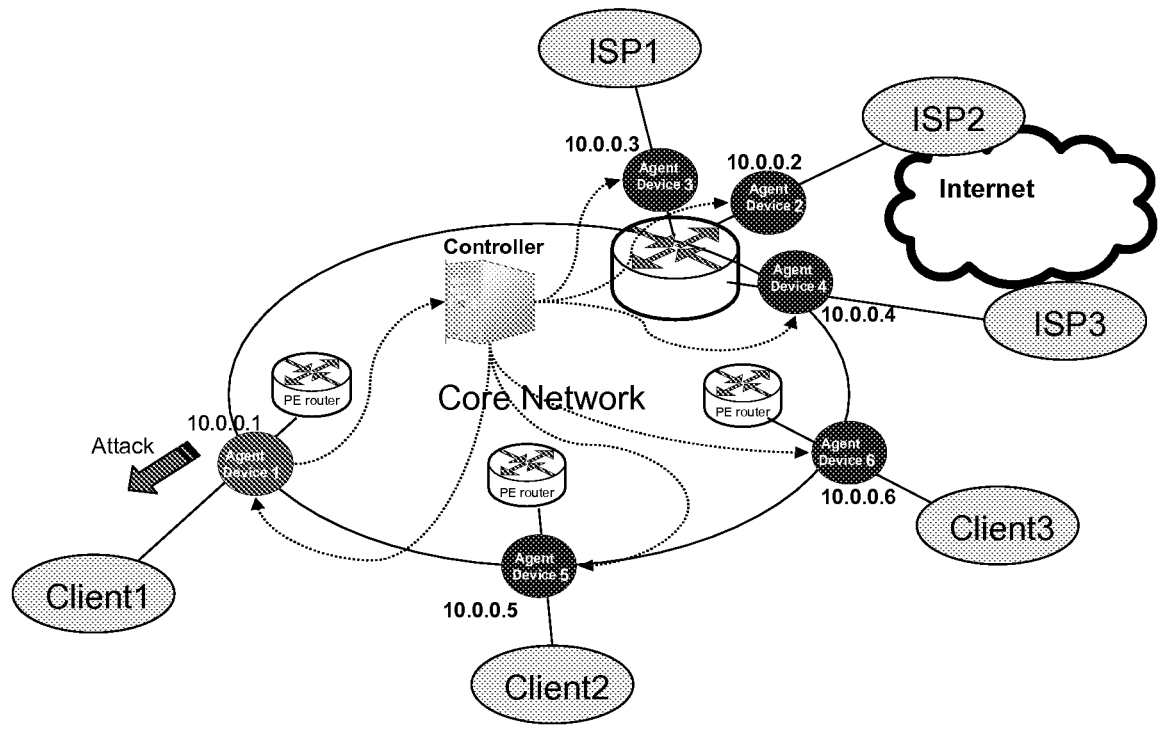
FIG. 24 illustrates vertical and horizontal propagation scenario (carrier environment).

FIG. 24 illustrates vertical and horizontal propagation scenario (carrier environment).

The default profile for both vertical and horizontal propagation rules is actually an aggregation of both default profile rules, as shown below in Table 25.

TABLE 25

| | | | | | | | Actions | | |
|---|---|---|---|---|---|---|---|---|---|
| | From device | | Filter | Accuracy | Worm | Generic | | Distribution | Distribution | |
| Rule # | IP | Area | type | Level | level | type | Direction | IP range | area | Filter State |
| 1 | 10.0.0.1, 10.0.0.5, 10.0.0.6 | A | B-DoS | =>H | =>L | g OR s | Inbound | 10.0.0.2-10.0.0.4 | B (vertical) | Block |
| 2 | 10.0.0.1, 10.0.0.5, 10.0.0.6 | A | Anti-Scan | =>M | =>H | g OR s | Inbound | 10.0.0.2-10.0.0.4 | B (vertical) | Detection |
| 3 | 10.0.0.1, 10.0.0.5, 10.0.0.6 | A | B-DoS | =M | =>L | g OR s | Inbound | 10.0.0.2-10.0.0.4 | B (vertical) | Detection |
| 4 | 10.0.0.1, 10.0.0.5, 10.0.0.6 | A | B-DoS | =>M | =>M | g OR s | Inbound | 10.0.0.1, 10.0.0.5, 10.0.0.6 | A (Horizontal) | Block |
| 5 | 10.0.0.1, 10.0.0.5, 10.0.0.6 | A | Anti-Scan | =>M | =>H | g OR s | Inbound | 10.0.0.1, 10.0.0.5, 10.0.0.6 | A (Horizontal) | Block |
| 6 | 10.0.0.1, 10.0.0.5, 10.0.0.6 | A | B-DoS | <L | =>L | g OR s | Inbound | 10.0.0.1, 10.0.0.5, 10.0.0.6 | A (Horizontal) | Detection |
| 7 | 10.0.0.2-10.0.0.4 | B | B-DoS | =>M | =>M | g OR s | Inbound | 10.0.0.2-10.0.0.4 | B (Horizontal) | Block |
| 8 | 10.0.0.2-10.0.0.4 | B | Anti Scan | =>M | =>H | g OR s | Inbound | 10.0.0.2-10.0.0.4 | B (Horizontal) | Block |
| 9 | 10.0.0.2-10.0.0.4 | B | B-DoS | <L | =>L | g OR s | Inbound | 10.0.0.2-10.0.0.4 | B (Horizontal) | Detection |

The above profile also includes the case in which one of the devices in area B (i.e., upstream devices) generate new attack generic signature. In this case, all other devices in area B will be horizontally updated.

Trace Inbound Propagation Profile

Figure 25:
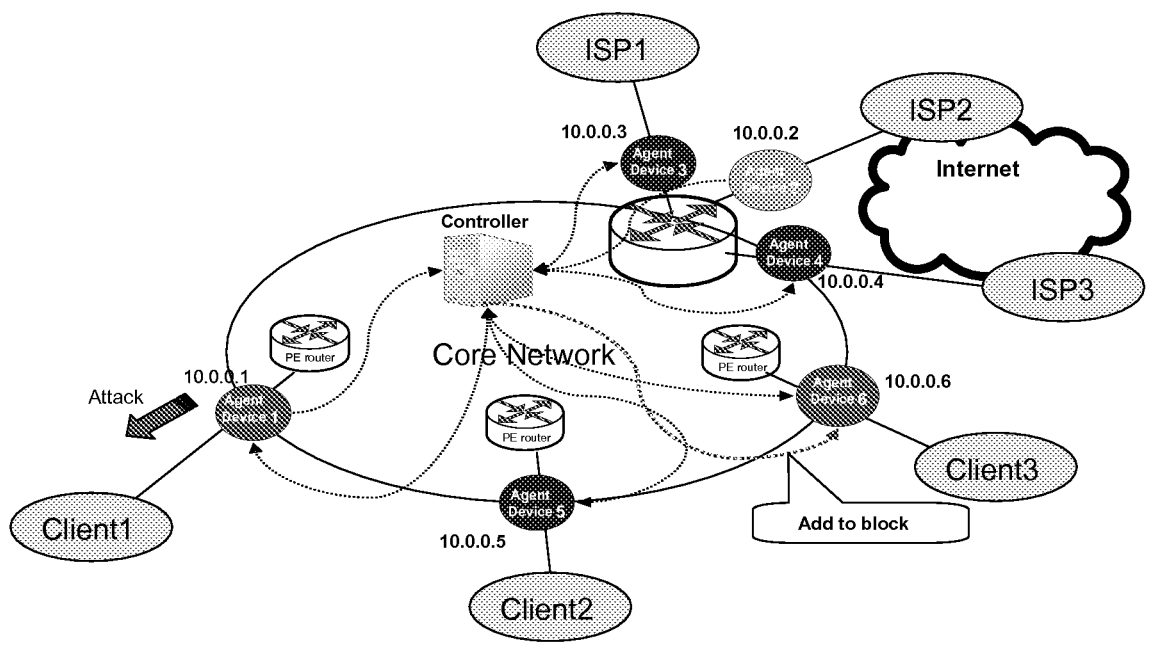
FIG. 25 illustrates typical trace propagation scenarios (carrier environment).

FIG. 25 shows typical trace propagation scenarios (carrier, network provider or ISP) environment).

The default advanced propagation rules in Table 26 reflect typical trace scenarios:

TABLE 26

| | | | | | | | Actions | | |
|---|---|---|---|---|---|---|---|---|---|
| | From device | | Filter | Accuracy | Worm | Generic | | Distribution | Distribution | |
| Rule # | IP | Area | type | Level | level | type | Direction | IP range | area | Filter State |
| 1 | 10.0.0.1, 10.0.0.5, 10.0.0.6 | A | B-DoS | =>M | =>L | g OR s OR t | Inbound | 10.0.0.2-10.0.0.6 | — | Trace* |

*Conditional action rule If trace statistics =>90% attack rate, then switch to Block In the scenario above an inbound attack was detected by agent device in client 1 (agent device 1). The new generic signature was propagated to all other agent devices in trace mode (i.e., 10.0.0.2-10.0.0.6).

Agent device 6 (client 3) has detected an intensive trace footprint activity (i.e., more than 90% PPS or Bps of the detected attack rate at customer 1) which means that the main origin of the attack is client 3. According to the advance action rule, the controller adds the trace generic signature to the generic block list (in block state) in agent device 6 (10.0.0.6).

In this way, the system blocks the attack at the nearest point to its center of gravity (i.e., nearest point to the attack's origin).

It should be noted that:

In case of trace scenario, blocking direction can be selected according to trace activities, e.g., if the trace generic signature identifies activity in only one direction then the blocking should apply at the same traffic direction. The scenario in FIG. 25 requires that switching from trace to block will apply only to outbound direction (i.e., attack that origin in client 3 will be blocked in the outgoing direction).

When using multiple propagation profiles there is a chance for conflict between the profiles' default footprint type configuration parameters and/or consistency parameters. Conflicts will be solved according to the following rules:

Footprint type parameters:
1. Disabled and Dynamic—Disabled will be applied
2. Disabled and enabled—Disabled will be applied
3. Enabled and Dynamic—Dynamic will be applied Consistency Parameters:
1. DTh: max DTh will be chosen
2. FTh: max FTh will be chosen Embodiments herein may be implemented in a computer program code-based product, which is a storage medium having program code stored therein which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices.

CONCLUSION

A system and method has been shown in the above embodiments for the effective implementation of a signature propagation network. While various preferred embodiments have been shown and described, it will be understood that there is no intent to limit the invention by such disclosure, but rather, it is intended to cover all modifications and alternate constructions falling within the spirit and scope of the invention.

What is claimed is:

1. A method implemented in a network including a plurality of intelligent security agents distributed across the network, comprising:
   identifying an on-going attack through behavioral analysis protection in said network;
   creating a generic attack signature of at least one of a denial-of-service (DoS) attack and a worm attack through said behavioral analysis by at least one of said plurality of intelligent security agents;
   sending said created generic attack signature to a controller;
   wherein said controller:
      receives said created generic attack signature from one of the plurality of intelligent security agents,
      matches said created generic attack signature to a plurality of propagation rules,
      selects one or more of said plurality of intelligent security agents to propagate said created generic attack signature to, when the said created generic attack signature matches at least one of the plurality of propagation rules, and
      propagates said created generic attack signature to the selected one or more of said plurality of intelligent security agents, wherein a blacklist associated with each of the selected one or more of said plurality of intelligent security agents is dynamically updated with the at least one propagated created generic attack signature, wherein each of said plurality of propagation rules defines at least one or more of the plurality of intelligent security agents that the created generic attack signature is propagated to, based in part on the intelligent security agent that created said generic attack signature, and attributes of said generic attack signature, wherein said attributes include at least one of the following attributes: an accuracy level of signature, a worm characteristic level, an attack rate, an attack direction, and a generality type.

2. The method of claim 1, wherein a generic attack signature rule is generated from multiple footprint types with each footprint type assigned an accuracy score and based on that a generic attack signature accuracy score is set.

3. The method of claim 2, wherein said generic attack signature rule is assigned with an attribute representing three generality levels: (1) generic for attack signatures that are effective for all registered networks; (2) generic/source for attack signatures that are effective in blocking attack traffic originating from a source network; and (3) generic/target for attack signatures limited to a target network.

4. The method of claim 2, wherein said generic attack signature is assigned a dynamic worm score, wherein said worm score is set based on a positive or negative score weight function and the footprint types and values included in the generic attack signature.

5. The method of claim 1, wherein said at least one network is at least one of: a local area network, a wide area network, and the Internet.

6. A method implemented in a controller communicating with a plurality of intelligent security agents distributed across a network, said method comprising:
   receiving at least one created generic attack signature of at least one of a DoS attack and a worm attack from an intelligent security agent over said network, said attack generic attack signature created through behavioral analysis;
   propagating, based on attributes of the generic attack signature and propagation rules, said received at least one created generic attack signature to one or more of said plurality of intelligent security agents, wherein a blacklist associated with each of said plurality of intelligent security agents distributed across said network is dynamically updated with said propagated at least one created generic attack signature, said update performed via an external update mechanism associated with each of said plurality of intelligent security agents distributed across said network, wherein each of said propagation rules defines at least one or more of the plurality of intelligent security agents that the created generic attack signature is propagated to, based in part on the intelligent security agent that said created generic attack signature, and said generic attack signature attributes parameters, wherein said generic attack signature parameters include at least one of the following attributes: an accuracy level of signature, a worm characteristic level, an attack rate, an attack direction, and a generality type.

7. The method of claim 6, wherein a generic attack signature rule is generated from multiple footprint types with each footprint type assigned an accuracy score and based on that a generic attack signature accuracy score is set.

8. The method of claim 7, wherein said generic attack signature rule is assigned an attribute representing three generality levels: (1) generic for attack signatures that are effective for all registered networks; (2) generic/source for attack signatures that are effective in blocking attack traffic originating from a source network; and (3) generic/target for attack signatures limited to a target network.

9. An article of manufacture comprising a non-transitory computer usable medium having computer readable program code embodied therein, said medium comprising:
    computer readable program code for identifying at least one of denial-of-service (DoS) attacks and worm attacks based on behavioral analysis;
    computer readable program code for creating a generic attack signature that characterizes said attacks through said behavioral analysis based on attack signature information regarding the at least one of DoS attacks and worm attacks;
    computer readable program code for sending said created generic attack signature to a controller;
    wherein said controller:
        receives said created generic attack signature from one of the plurality of intelligent security agents,
        matches said created generic attack signature to a plurality of propagation rules, selects one or more of said plurality of intelligent security agents to propagate said created generic attack signature to, when the said created generic attack signature matches at least one of the plurality of propagation rules, and
        propagates said created generic attack signature to the selected one or more of said plurality of intelligent security agents, wherein a blacklist associated with each of the selected one or more of said plurality of intelligent security agents is dynamically updated with the at least one propagated created generic attack signature, wherein each of said plurality of propagation rules defines at least one or more of the plurality of intelligent security agents that the created generic attack signature is propagated to, based in part on the intelligent security agent that created said generic attack signature, and attributes of said generic attack signature, wherein said attributes include at least one of the following attributes: an accuracy level of signature, a worm characteristic level, an attack rate, an attack direction, and a generality type.

10. The article of manufacture of claim 9, wherein said non-transitory computer readable program code additionally generates a generic attack signature rule from multiple footprint types with each footprint type assigned an accuracy score and based on that a generic attack signature accuracy score is set.

11. A distributed security system comprising:
    a plurality of intelligent security agents distributed across a network, said intelligent security agents comprising:
        a blacklist identifying a plurality of signatures used in restricting packet flow in said network;
        a generic attack signature creating module to create a generic attack signature through behavioral analysis;
        a propagation mechanism to propagate said created generic attack signature to a controller;
        an external update mechanism to receive updates to said blacklist from said controller;
        a denial of service (DoS) module forwarding attack signature information regarding a DoS attack to said generic attack signature creating module;
        an anti-scan behavioral module forwarding attack signature information regarding a worm attack to said generic attack signature creating module, said generic attack signature information, after being created by the generic attack signature creation module, regarding said worm and DoS attack further including at least one of the following attributes: an accuracy level of footprint, a worm characteristic level, an attack rate, an attack direction, and a generality type; and
    said controller communicating with each of said plurality of said intelligent security agents over said network, said controller performs:
        receiving the created generic attack signatures from at least one of the plurality of intelligent security agents,
        matching said created generic attack signature to a plurality of propagation rules, selecting one or more of said plurality of intelligent security agents to propagate said created generic attack signature to, when the said created generic attack signature matches at least one of the plurality of propagation rules, and
        propagating said created generic attack signature to the selected one or more of said plurality of intelligent security agents, wherein a blacklist associated with each of the selected one or more of said plurality of intelligent security agents is dynamically updated with the at least one propagated created generic attack signature, wherein each of said plurality of propagation rules defines at least one or more of the plurality of intelligent security agents that the created generic attack signature is propagated to based in part on an intelligent security agent that created said generic attack signature and attributes of said generic attack signature, said update performed via the external update mechanism associated with each of said plurality of intelligent security agents distributed across said network.

12. The distributed security system of claim 11, wherein a generic attack signature rule is generated from multiple footprint types with each footprint type assigned an accuracy score and based on that a generic attack signature accuracy score is set.

* * * * *